US008446459B2

(12) United States Patent
Fang et al.

(10) Patent No.: US 8,446,459 B2
(45) Date of Patent: May 21, 2013

(54) VIDEO COMMUNICATION METHOD, DEVICE, AND SYSTEM

(75) Inventors: Ping Fang, Shenzhen (CN); Chen Liu, Shenzhen (CN); Yuan Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 278 days.

(21) Appl. No.: 12/971,392

(22) Filed: Dec. 17, 2010

(65) Prior Publication Data

US 2011/0090311 A1    Apr. 21, 2011

Related U.S. Application Data

(63) Continuation of application No. PCT/CN2009/072320, filed on Jun. 17, 2009.

(30) Foreign Application Priority Data

Jun. 17, 2008 (CN) .......................... 2008 1 0127007
Aug. 29, 2008 (CN) .......................... 2008 1 0210178

(51) Int. Cl.
*H04N 13/00* (2006.01)

(52) U.S. Cl.
USPC .......................................................... 348/43

(58) Field of Classification Search
USPC .......................................................... 348/43
See application file for complete search history.

(56) References Cited

U.S. PATENT DOCUMENTS

| 7,227,567 | B1 | 6/2007 | Beck et al. |
| 2005/0151850 | A1 | 7/2005 | Ahn et al. |

FOREIGN PATENT DOCUMENTS

| CN | 1275871 A | 12/2000 |
| EP | 1796047 A1 | 6/2007 |
| JP | 2000175171 A | 6/2000 |
| JP | 2001141422 A | 5/2001 |
| WO | WO02/069272 A2 | 9/2002 |
| WO | WO 03/017680 A1 | 2/2003 |

OTHER PUBLICATIONS

"High-definition real-time depth-mapping TV camera: HDTV Axi-Vision Camera" Optical Society of America 2004, to Kawakita et al.*
"Depth map creation and image-based rendering for advanced 3DTV services providing interoperability and scalability" Elsevier 2007, to Kauff et al.*
"3D imaging in the studio" G.J. Iddan & G. Yahav in Three-Dimensional Image Capture and Applications Proceedings of SPIE vol. 4298 (2001).*

(Continued)

*Primary Examiner* — Mehrdad Dastouri
*Assistant Examiner* — Mohammed Rahaman
(74) *Attorney, Agent, or Firm* — Brinks Hofer Gilson & Lione

(57) ABSTRACT

A video communication method, device, and system are provided, which relate to the filed of video communications, so as to solve problems that currently scenes of two parties of communication need special arrangement to improve sense of reality and scene contents cannot be displayed in a 3D video mode. Therefore, scenes of two parties of communication do not need special arrangement to improve the sense of reality of users, and the scene contents can be displayed in a 3D video mode. The video communication method, device, and system are applicable to video communication such as common video chat, video telephony, and video conference.

10 Claims, 14 Drawing Sheets

OTHER PUBLICATIONS

"Depth keying" Ronen Gvili, Amir Kaplan, Eyal Ofek and Giora Yahav 3DV Systems Ltd.*

Zitnick, C. et al., "High-quality video view interpolation using a layered representation," XP-0023544522.

Izquierdo, E. et al., "Image-based rendering and 3D modeling: A complete framework," XP4202017, Signal Processing: Image Communication 15 (2000) 817-858.

Extended European Search Report dated (mailed) Apr. 26, 2011, issued in related Application No. 09765408.1-2202, PCT/CN2009072320, Hauwei Technologies Co., Ltd.

Written Opinion of the International Searching Authority (translation) dated (mailed) Oct. 1, 2009 issued in related Application No. PCT/CN2008/071069, filed Jun. 17, 2009, Huawei Technologies Co., Ltd.

First Chinese Office Action dated (mailed) Sep. 9, 2010, issued in related Chinese Application No. 200810127007.4.Huawei Technologies Co., Ltd.

International Search Report for International Application No. PCT/CN2009/072320, mailed Oct. 1, 2009 Huawei Technologies Co., Ltd.

"Study on Image Segmentation of Moving Human Body Integrating Depth Information" Mar. 2006.

Zhu,Z. et al,"New Algorithms for Object Segmentation and Stereo Correspondence in Stereo Video Coding" 2003 Journal of Software vol. 14, No. 11.

Gvili, R. et al., "Depth Keying," 3DV Systems Ltd.

Polycom® People on Content™—Chroma Key Technology—Products—Polycom.htm.

* cited by examiner

Other local foregrounds and backgrounds

Remote person

Depth position relation after synthesis

VIDEO COMMUNICATION METHOD, DEVICE, AND SYSTEM

CROSS-REFERENCE TO RELATED APPLICATIONS

This application is a continuation of International Application No. PCT/CN2009/072320, filed on Jun. 17, 2009, which claims priority to Chinese Patent Application No. 200810127007.4, filed on Jun. 17, 2008 and Chinese Patent Application No. 200810210178.3, filed on Aug. 29, 2008, all of which are hereby incorporated by reference in their entireties.

FIELD OF THE TECHNOLOGY

The present invention relates to the field of video communication, and more particularly to a video communication method and a device and a system using the video communication method.

BACKGROUND OF THE INVENTION

With the ongoing development of the communication technology, the video communication technology is already widely used. For example, the video communication technology is used in video telephony, video conference, and the like. Currently, a conventional 2D image or video is mainly used in various video communication applications.

Currently, for target extraction of an image content, a chroma key method is mainly adopted to extract a foreground target in a video through color segmentation. In video communication, the extracted foreground target is synthesized with other remote videos to improve the sense of reality. For example, a person (a foreground target) in the video is synthesized with remote slide notes. However, the chroma key method has the following defects.

1. The chroma key method requires that a background of the video to be segmented is blue, green or other single colors to realize segmentation of the foreground target from the background, and requires that the color in the background should not appear in the foreground. The color requirements for the background and foreground in the method are strict, causing inconvenience in use.

2. The chroma key method can only differentiate the foreground target from the background and scene content cannot be divided into more layers, so that replacement of a part of targets in the foreground cannot be achieved. For example, in a conference scene, a desk might exist in front of a person. If a desk of another party is replaced by a local desk, sense of reality can be improved. However, the chroma key method cannot replace the desk of the other party with a local desk, so that the sense of reality cannot be further improved.

3. The technology only realizes replacement of a 2D video content, and a user is unable to experience the depth of the scene, so the technology lacks the sense of reality.

The 2D image or video can only present a content of scenery, but cannot reflect depth information such as distances and positions of scenery.

Humans are used to observing the world with two eyes. Due to parallax of two eyes, the observed scenery has good distance and position perception, and stereo sensation of the scenery can be presented. In the stereo video technology, scene contents that are shown to a left eye and a right eye of a person are slightly different based on a principle of two-eye parallax, so as to enable the person to obtain a feeling of depth and layers of the scene.

In order to improve the sense of reality of the video communication, in the prior art a stereo video technology is adopted and special decoration is made for scenes of both parties of the communication, so that users feel that the two parties of the communication are in the same scene, so as to improve the sense of reality. For example, indoor environment of the two parties of the communication are arranged the same. Therefore, during the communication, it seems to the user that the other one in the video is in the same scene. However, an application scope of the method is limited by environment arrangement of the two parties.

In the prior art, an interactive presentation system is further provided. The system mainly includes a movable infrared camera and a command recognition unit and a synthesis unit connected to the infrared camera. The presentation system of the prior art first photographs an image of a video object by using the movable infrared camera, so as to acquire information of the video object. Subsequently, the command recognition unit converts the information into an output command signal and sends the output command signal to the synthesis unit. The information from the video object can include an infrared image of recognizing a gesture of the video object photographed by the infrared camera or received speech of the video object. Finally, the synthesis unit synthesizes the image of the video object photographed by the infrared camera and an image of a presentation material, controls positions of the video object, and controls screen display of the presentation material according to the output command signal of the command recognition system.

However, the presentation system provided in the prior art supports only a 2D video display mode, but does not support the 3D video display mode.

SUMMARY OF THE INVENTION

The present invention is directed to a video communication method, apparatus, and system, which are not limited by environment arrangement of two parties of communication, so as to improve sense of reality for the two parties of communication during the communication and display a scene content in a 3D video mode.

In the embodiments, the present invention provides the following technical solutions.

The present invention provides a video preprocessing method, which includes the following steps.

Local scene contents and depth values thereof are acquired.

A local target content is segmented from the local scene contents according to the depth values of the local scene contents.

The present invention provides a video preprocessing device, which includes an information acquisition module and a segmentation module.

The information acquisition module is configured to acquire local scene contents and depth values thereof.

The segmentation module is configured to segment a local target content from the local scene contents according to the depth values of the local scene contents.

The present invention provides a video receiving method, which includes the following steps.

A remote target content and a depth value of the remote target content sent by a remote end are received.

A local background content and a depth value of the local background content are acquired.

The remote target content and the local background content are synthesized into a scene content according to the depth value of the remote target content and the depth value of the local background content.

The present invention provides a video receiving device, which includes a transmission interface module, an extraction module, and a synthesis module.

The transmission interface module is configured to receive a remote target content and a depth value of the remote target content sent by a remote end.

The extraction module is configured to acquire a local background content and a depth value of the local background content.

The synthesis module is configured to synthesize the remote target content and the local background content into a scene content according to the depth value of the remote target content and the depth value of the local background content.

The present invention provides a video communication system, which includes a sending end and a receiving end.

The sending end is configured to acquire a sending-end scene content and a depth value of the sending-end scene content, segment a sending-end target content from the sending-end scene content according to the depth value of the sending-end scene content, and send the sending-end target content and a depth value of the sending-end target content.

The receiving end is configured to receive the sending-end target content and the depth value of the sending-end target content sent by the sending end, acquire a receiving-end background content and a depth value of the receiving-end background content, and synthesize the sending-end target content and the receiving-end background content into a scene content according to the depth value of the sending-end target content and the depth value of the receiving-end background content.

The present invention provides a video processing method, which includes the following steps.

Color/grayscale images of at least two viewpoints of a video object to be presented and a color/grayscale image of at least one viewpoint of at least one presentation material are acquired.

The color/grayscale images of the at least two viewpoints of the video object and the color/grayscale image of the at least one viewpoint of the at least one presentation material are synthesized to acquire a presentation image.

The presentation image is displayed in a 3D mode.

The present invention provides a video sending method, which includes the following steps.

Color/grayscale images of at least two viewpoints of a video object to be presented and a color/grayscale image of at least one viewpoint of at least one presentation material are acquired.

The color/grayscale images of the at least two viewpoints of the video object and the color/grayscale image of the at least one viewpoint of the at least one presentation material are synthesized to acquire a presentation image.

The presentation image is encoded and sent.

The present invention provides a video sending method, which includes the following steps.

Color/grayscale images of at least two viewpoints of a video object to be presented and a color/grayscale image of at least one viewpoint of at least one presentation material are acquired.

The color/grayscale images of the at least two viewpoints of the video object to be presented and the color/grayscale image of the at least one viewpoint of the at least one presentation material are encoded and sent.

The present invention provides a video receiving method, which includes the following steps.

An encoded image is acquired.

The encoded image is decoded to obtain color/grayscale images of at least two viewpoints of a video object to be presented and a color/grayscale image of at least one viewpoint of at least one presentation material.

The color/grayscale images of the at least two viewpoints of the video object and the color/grayscale image of the at least one viewpoint of the at least one presentation material are synthesized to acquire a presentation image.

The presentation image is displayed in a 3D mode.

The present invention provides a video processing device, which includes an image acquisition and processing unit and a display unit.

The image acquisition and processing unit is configured to acquire color/grayscale images of at least two viewpoints of a video object to be presented and a color/grayscale image of at least one viewpoint of at least one presentation material, and synthesize the color/grayscale images of the at least two viewpoints of the video object and the color/grayscale image of the at least one viewpoint of the at least one presentation material to acquire a presentation image.

The display unit is configured to display the presentation image in a 3D mode.

The present invention provides a video sending device, which includes an image acquisition unit, an encoding unit, and a sending unit.

The image acquisition unit is configured to acquire color/grayscale images of at least two viewpoints of a video object to be presented and a color/grayscale image of at least one viewpoint of at least one presentation material.

The encoding unit is configured to encode the color/grayscale images of the at least two viewpoints of the video object to be presented and the color/grayscale image of the at least one viewpoint of the at least one presentation material to obtain an encoded image.

The sending unit is configured to send the encoded image.

The present invention provides a video receiving device, which includes a receiving unit, a decoding unit, a synthesis unit, and a display unit.

The receiving unit is configured to receive an encoded image.

The decoding unit is configured to decode the acquired encoded image, so as to acquire color/grayscale images of at least two viewpoints of a video object to be presented and a color/grayscale image of at least one viewpoint of at least one presentation material.

The synthesis unit is configured to synthesize the color/grayscale images of the at least two viewpoints of the video object and the color/grayscale image of the at least one viewpoint of the at least one presentation material to acquire a presentation image.

The display unit is configured to display the presentation image in a 3D mode.

The present invention provides a video sending device, which includes an image acquisition and processing unit, an encoding unit, and a sending unit.

The image acquisition and processing unit is configured to acquire color/grayscale images of at least two viewpoints of a video object to be presented, and synthesize the color/grayscale images of the at least two viewpoints of the video object and a color/grayscale image of at least one viewpoint of at least one presentation material to acquire a presentation image.

The encoding unit is configured to encode the presentation image to obtain an encoded image.

The sending unit is configured to send the encoded image.

The present invention provides a video communication system, which includes a video sending device and a video receiving device.

The video sending device includes an image acquisition and processing unit, an encoding unit, and a sending unit.

The image acquisition and processing unit is configured to acquire color/grayscale images of at least two viewpoints of a video object to be presented and a color/grayscale image of at least one viewpoint of at least one presentation material, and synthesize the color/grayscale images of the at least two viewpoints of the video object and the color/grayscale image of the at least one viewpoint of the at least one presentation material to acquire a presentation image.

The encoding unit is configured to encode the presentation image to obtain an encoded image.

The sending unit is configured to send the encoded image.

The video receiving device includes a receiving unit, a decoding unit, and a display unit.

The receiving unit is configured to receive the encoded image.

The decoding unit is configured to decode the received encoded image to acquire the presentation image.

The display unit is configured to display the presentation image in a 3D mode.

In the embodiments of the present invention as described in the technical solutions, during video communication, a picture displayed locally needs to be obtained by synthesizing a local background content and a remote target content, so that a user can view a background in the picture exactly the same as a scene that the user is in, and it seems that two parties of communication are in the same environment, so as to improve sense of reality of the users during communication. Also, in the embodiments, the scenes of the two parties of the communication do not need special arrangement, environments of the two parties of the communication are allowed to be different, and the background also does not need to be changed to a single color, so that implementation of the embodiment of the present invention is not limited by the environments of the two parties of communication and the sense of reality during the communication can be improved. In the embodiments of the present invention, a presentation image is generated by acquiring multi-viewpoint color/grayscale images of a video object and a color/grayscale image of a presentation material, and the presentation image supports a 3D display mode, so by displaying the presentation image is in the 3D mode, the problem that only 2D video presentation is supported in the prior art is solved, thereby achieving the 3D video presentation.

DETAILED DESCRIPTION OF THE EMBODIMENTS

In the embodiments of the present invention, a local background content and a remote target content are synthesized into a picture to be displayed, so that two parties of communication do not need to make special arrangement for a scene to make the scene in the picture the same as that in which one of the two parties is, so as to improve the sense of reality in a communication process and display the scene content in a 3D video mode. A video communication method, device, and apparatus according to the embodiments of the present invention are illustrated in detail in the following with reference to the accompanying drawings.

Embodiment One

Figure 1:
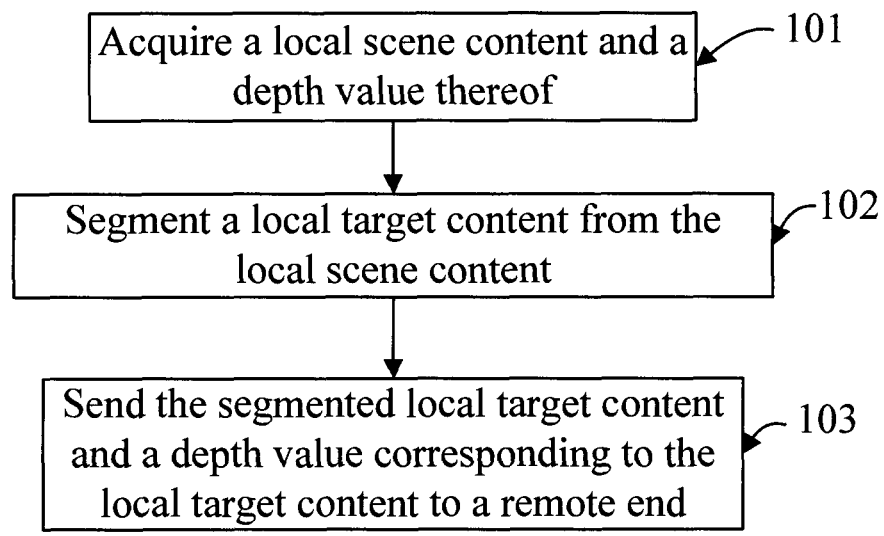
FIG. 1 is a flow chart of a video preprocessing method according to a first embodiment of the present invention.

In this embodiment, the present invention provides a video preprocessing method. As shown in FIG. 1, the video preprocessing method includes the following steps.

In Step 101, local scene contents and depth values thereof are acquired by using a depth camera or a stereo camera.

In Step 102, the local scene contents can be divided into more than two layers through the depth values of the local scene contents, so that a layer in which a local target content exists is segmented, that is, the local target content is segmented from the local scene contents.

In Step 103, the segmented local target content and a depth value corresponding to the local target content are sent to a remote end, usually, sent to an opposite end of the communication.

In this embodiment, the preprocessing of the image is accomplished mainly through Steps 101 and 102. In Step 103, the preprocessed content is sent, so that Step 103 can be omitted.

Figure 2:
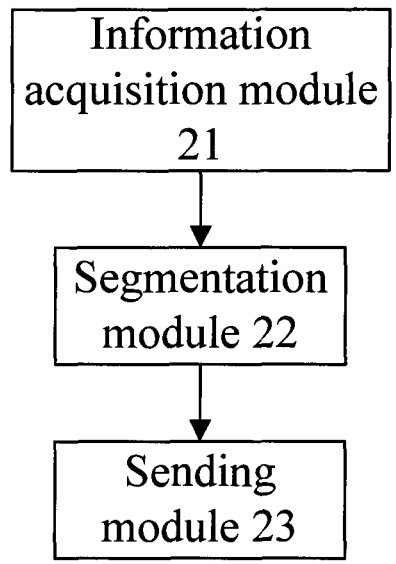
FIG. 2 is a block diagram of a video preprocessing device according to the first embodiment of the present invention.

Corresponding to the video preprocessing method, in this embodiment, the present invention further provides a video preprocessing device. As shown in FIG. 2, the video preprocessing device includes an information acquisition module 21, a segmentation module 22, and a sending module 23.

The information acquisition module 21 is configured to acquire local scene contents and depth values thereof. The information acquisition module can be implemented as a depth camera or a stereo camera. The depth camera acquires a depth of the image through the infrared technology, and the stereo camera acquires the depth of the image by using dual cameras. After the depth values of the local scene contents are obtained, the local scene contents can be divided into more than two layers. The segmentation module 22 is configured to segment a local target content from the local scene contents according to the depth values of the local scene contents. The sending module 23 is configured to send the local target content and a depth value thereof to a remote end.

The video preprocessing device completes video preprocessing mainly by using the information acquisition module 21 and the segmentation module 22. The sending module 23 can be omitted.

Figure 3:
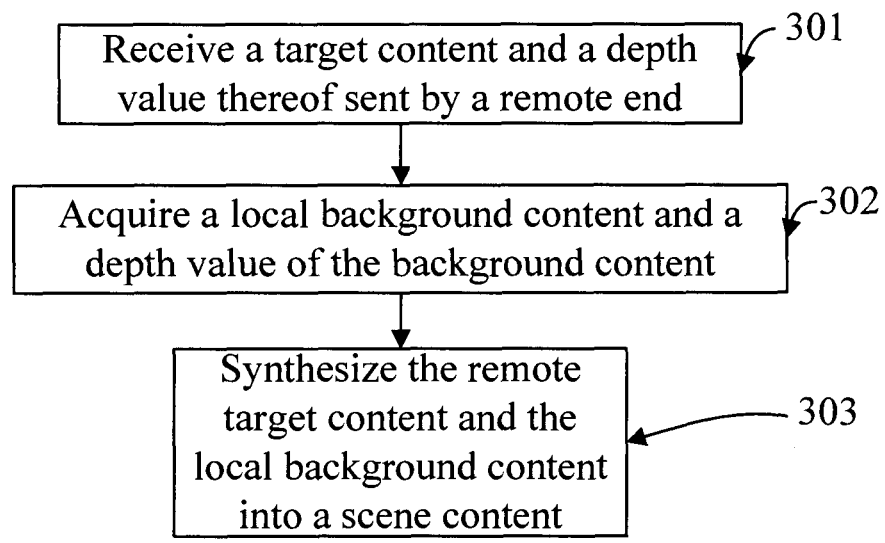
FIG. 3 is a flow chart of a video receiving method according to the first embodiment of the present invention.

In order to accomplish the video communication, in this embodiment, the present invention further provides a video receiving method corresponding to the video preprocessing method. As shown in FIG. 3, the video receiving method includes the following steps.

In Step 301, a target content and a depth value thereof sent by a remote end are received.

In Step 302, a local background content and a depth value of the background content are acquired.

In Step 303, according to a difference between the depth values, a blockage relation between the local background content and the remote target content is determined. Usually, a pixel having a smaller depth value blocks a pixel having a larger depth value. Therefore, the remote target content and the local background content can be synthesized into a scene content according to the depth value relation.

Figure 4:
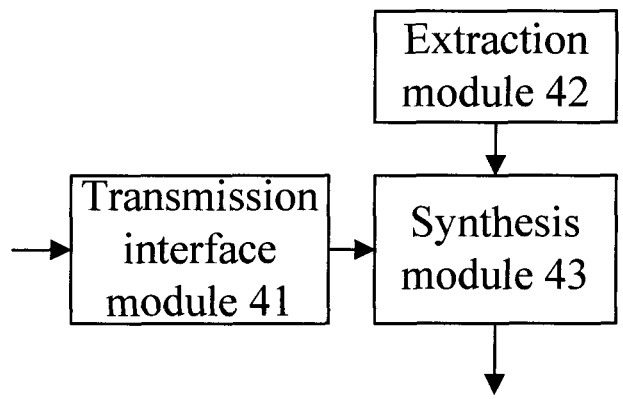
FIG. 4 is a block diagram of a video receiving device according to the first embodiment of the present invention.

Corresponding to the video receiving method, in this embodiment, the present invention further provides a video receiving device. As shown in FIG. 4, the video receiving device includes a transmission interface module 41, an extraction module 42, and a synthesis module 43.

The transmission interface module 41 is configured to receive a target content and a depth value thereof sent by a remote end. The extraction module 42 is configured to acquire a local background content and a depth value thereof. The synthesis module 43 is configured to synthesize the remote target content and the local background content into a scene content according to a depth value relation. Usually, a pixel having a smaller depth value blocks a pixel having a larger depth value. Finally, the synthesized scene content is displayed on an apparatus such as a display.

Figure 5:
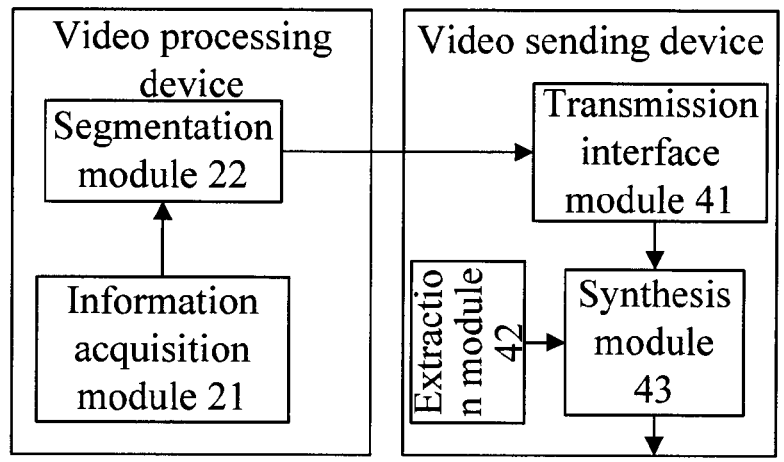
FIG. 5 is a principle diagram of a video communication apparatus according to the first embodiment of the present invention.

As shown in FIG. 5, in an embodiment, the present invention further provides a video communication apparatus, which specifically includes an information acquisition module 51, a segmentation module 52, a transmission interface module 53, an extraction module 54, and a synthesis module 55.

The information acquisition module 51 is configured to acquire local scene contents and depth values thereof. The information acquisition module 51 can be implemented as a depth camera or a stereo camera. The depth camera acquires a depth of the image through the infrared technology, and the stereo camera acquires the depth of the image by using dual cameras. The segmentation module 52 is configured to segment a local target content from the local scene contents according to the depth values of the local scene contents. The transmission interface module 53 is configured to send the local target content and a depth value thereof to a remote end.

The transmission interface module 53 is further configured to receive a target content and a depth value thereof sent by the remote end. The extraction module 54 is configured to acquire a local background content and a depth value thereof. The synthesis module 55 is configured to synthesize the remote target content and the local background content into a scene content according to a depth value relation. Usually, a pixel having a smaller depth value blocks a pixel having a larger depth value. Finally, the synthesized scene content is displayed on a display module.

The local background content may be the residual content after the segmentation module 54 segments the local target content, or a background content and a depth value thereof opposite to the local target can be acquired by using another camera.

In this embodiment, if communication is performed between the video preprocessing device and the video receiving device, for example, both the devices access the same network to form a video communication system, a sending end of the system includes the video preprocessing device in FIG. 2, and a receiving end includes the video receiving device in FIG. 4.

Embodiment Two

In this embodiment, the present invention provides a video communication apparatus. The apparatus sends a local target content in the local scene contents and a depth value corresponding to the local target content to an opposite apparatus. After receiving the local target content, the opposite apparatus synthesizes the local target content and the opposite background content into a scene and displays the scene to a user at the opposite end. Therefore, it is ensured that the scene viewed by the opposite user is exactly the same as the scene that the opposite user is in, so as to provide the sense of presence and sense of reality. After receiving the remote target content, the local video communication apparatus synthesizes the remote target content and the local background content into a scene and displays the scene to the local user, so as to improve the sense of presence and sense of reality of the local user in the communication process.

Figure 6:
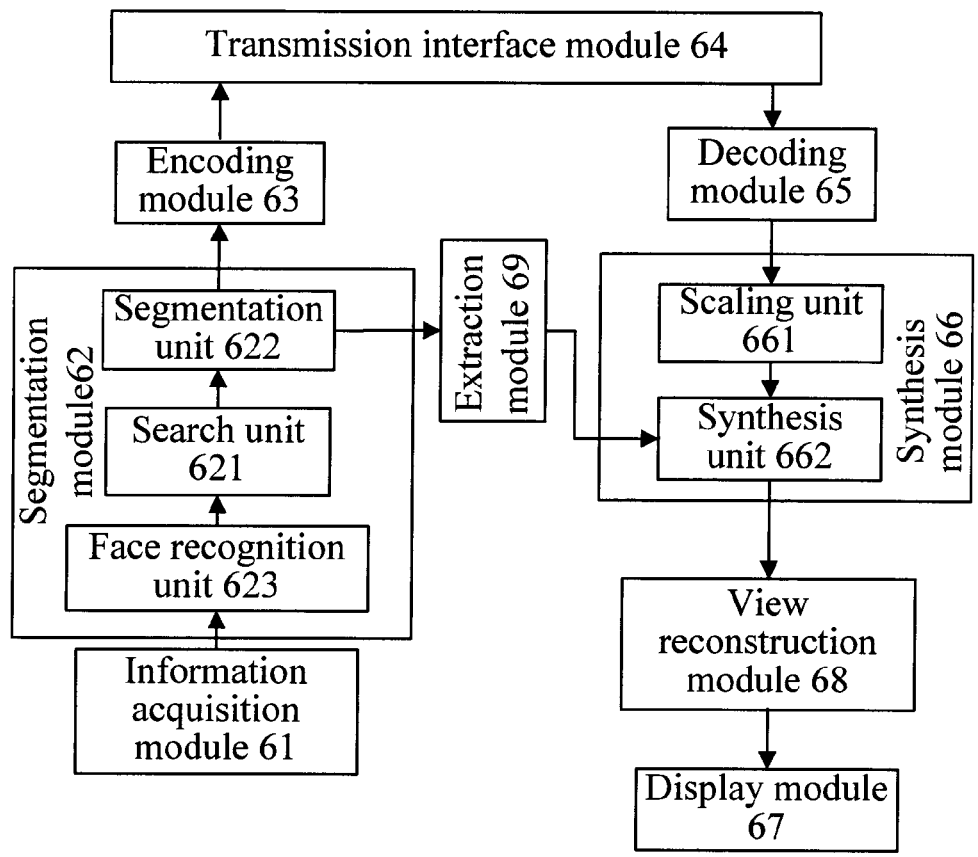
FIG. 6 is a principle diagram of a video communication apparatus according to a second embodiment of the present invention.

As shown in FIG. 6, the video communication apparatus mainly includes an information acquisition module 61, a segmentation module 62, an encoding module 63, a transmission interface module 64, a decoding module 65, a synthesis module 66, and a display module 67.

The information acquisition module 61 is configured to photograph local scene contents and calculate depth values corresponding to the local scene contents, or directly acquire the depth values corresponding to the local scene contents. The segmentation module 62 is configured to segment a local target content from the local scene contents according to the depth value. The encoding module 63 is configured to encode the segmented local target content and a depth value corresponding to the local target content. The transmission interface module 64 is configured to send the local target content and the depth value thereof or receive the target content and the depth value thereof sent by a remote end. The decoding module 65 is configured to decode the received remote target content and the depth value thereof. The synthesis module 66 is configured to synthesize the decoded remote target content and a local background content, and generate a stereo view according to the corresponding depth value, in which the local background content may be a residual content in the local scene contents after the local target content is segmented or a scene content opposite to the local target photographed by using another group of cameras. The display module 67 is configured to display the synthesized image, which may be a stereo display apparatus or a normal 2D display apparatus. If the display module 67 is the stereo display apparatus, a 2D image of another viewpoint needs to be reconstructed.

In the following, each module in the video communication apparatus according to this embodiment is illustrated in detail respectively.

The information acquisition module 61 may be implemented in two modes. In Mode 1, local scene contents and depth values thereof are obtained at the same time by using a depth camera. In Mode 2, the local scene contents are photographed by using more than two cameras, and a corresponding depth value is obtained through a method of stereo image matching.

The depth camera is a new type of camera. The depth camera can acquire a depth value corresponding to each pixel in a red green blue (RGB) color image at the same time when photographing the color image. Currently, the depth camera mainly acquires a depth value of a target in a scene in an infrared mode.

In the method of obtaining the corresponding depth value through the stereo image matching, more than two cameras are required to photograph a scene during image acquisition, so as to obtain more than two images of the scene in different angles. By matching the images, a parallax of the scene in different images can be obtained. According to internal and external parameters of the parallax and the cameras, the depth value corresponding to each pixel in the image can be calculated. In the following an example of two cameras is taken to illustrate the acquisition of the depth value in an image matching mode.

Figure 7:
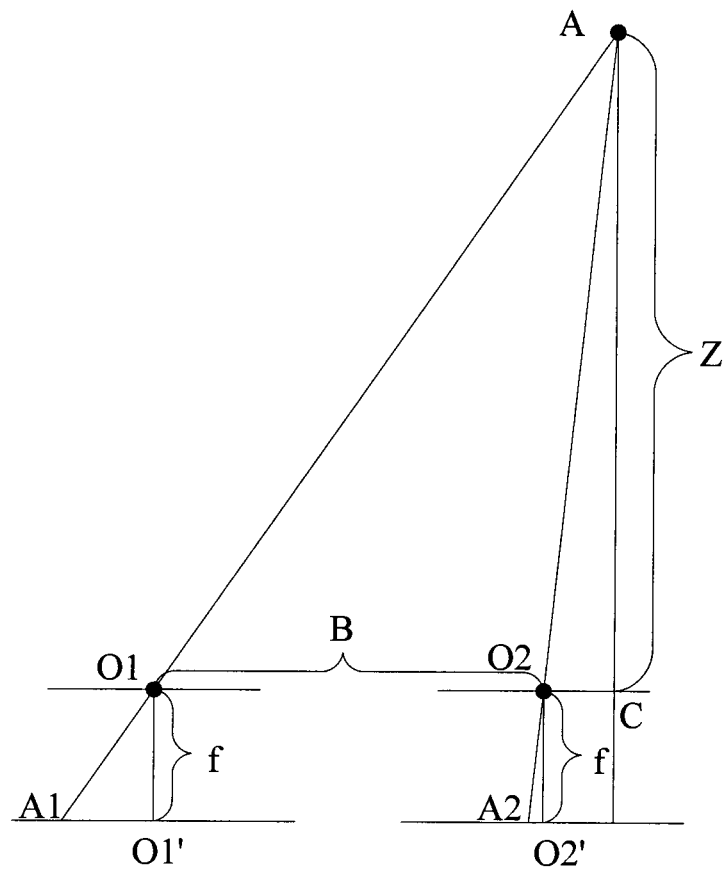
FIG. 7 is a principle diagram of a stereo camera according to the second embodiment of the present invention.

FIG. 7 is a schematic view of imaging by two parallel cameras placed horizontally, in which O1 and O2 are optical centers of two cameras respectively, a distance therebetween is B, a distance between a point A and a vertical point O of the camera is Z (that is, a depth of the point A), and A1 and A2 are imaging points of the point A in the two cameras respectively.

Through similarity between a triangle A1 O1 O1' and a triangle A O1 C, it can be obtained that $$\frac{A1O1'}{CO1} = \frac{f}{Z}.$$

Through similarity between a triangle A2 O2 O1' and a triangle A O2 C, it can be obtained that $$\frac{A2O2'}{CO2} = \frac{f}{Z}.$$

Therefore, it can be derived that a parallax of the two imaging points is d=A1O1'−A2O2'=f*(CO1−CO2)/Z=f*B/Z.

Thus, it can be can obtained that a depth value of the point A is Z=f*B/d.

As the focal length f is known and B can be measured, d can be calculated through the image matching method. Therefore, the depth value corresponding to each point in the scene can be acquired by using two cameras.

The acquisition of the depth information by using the stereo camera includes the following steps. Imaging points corresponding to a certain point in the scene in more than two images are found. Subsequently, according to coordinates of the point in more than two images, a depth value thereof is calculated. The process for finding the imaging points corresponding to the point in the scene in different images is accomplished through image matching. Current image matching technology mainly includes window-based matching, feature-based matching, and dynamic programming.

A grayscale-based matching algorithm is adopted in both the window-based matching and the dynamic programming. The grayscale-based algorithm is to segment one of the images into more than two small sub-regions, grayscale values of which are used as templates to find sub-regions having grayscale value distribution most similar to the sub-regions in other images. If two sub-regions satisfy requirements for similarity of grayscale value distribution, it can be considered that the points in the sub-regions are matched, that is, the imaging points of the two sub-regions are imaging of the same point in the scene. In a matching process, similarity of two regions is usually measured through a correlation function.

In the feature-based matching, grayscales of the image are not used directly but instead the matching is performed by using the features derived from the grayscale information of the images, so that the feature-based matching is more stable compared with matching by using simple change information of brightness and grayscales. The matching features may be important potential features that can describe the 3D structure of the scene, for example, an intersection point (a corner point) between edges. In the feature-based matching, a sparse depth information diagram is usually obtained first and subsequently a dense depth information diagram of the image is obtained through a method which for example uses an interpolation value.

The segmentation module 62 segments the image according to the local scene contents and the depth values corresponding to the local scene contents to obtain the local target content in the local scene. The segmentation module 62 may be implemented with a search unit 621 and a segmentation unit 622. The search unit 621 is configured to search regions where the local target content appears in the local scene contents. The segmentation unit 622 is configured to perform accurate edge contour extraction on the regions of the local target content in the local scene contents, so as to segment at the local target content and other local background content.

Generally, for the regions where the local target content appears in the local scene, a local user sets a depth value range of the local target content after estimating a position of the local target relative to the camera. In subsequent video processing, the search unit searches regions where the target content appears in the depth value range.

If the local target content to be searched is a person image, a face recognition unit 623 can automatically recognize a position at which a face image appears from the local scene contents through an existing face recognition technology. Subsequently, the search unit 621 searches for a depth value corresponding to the position of the face image in the depth values of the local scene contents. Then, a range of the depth value of the local target content is determined according to the found depth value, and a region of the local target content in the scene content is determined according to the range of the depth value. Thus, a depth range of a person target appearing in the scene is determined.

As the depth value is corresponding to the color image, the person region segmented according to the depth value is corresponding to the person region in the color image. The obtained local target content and depth value thereof of the color image are sent to the encoding module 63. The encoding module 63 encodes the local target content and the depth value thereof, and sends them to a remote end through the transmission interface module 64.

As the local target contents extracted from the color image have different sizes, the local target contents need to be adjusted to the same size. The local target contents are usually adjusted to a size the same as that of the local scene contents, so as to obtain an image to be encoded having the same size from each frame, thereby facilitating the encoding. In the adjustment, the local target content is not scaled but only a size of a canvas used for the local target content is changed. Blank regions that appear after size adjustment can be filled with a value 0.

In this embodiment, the encoding module 63 encodes the segmented local target content and the depth value thereof. Compared with a single-channel 2D video, the stereo video has a much larger data amount as the two-eye stereo video has two data channels. The increase of the video data causes difficulties in data storage and transmission. Current stereo video encoding also mainly includes two types, namely, block-based encoding and object-based encoding. In the encoding of the stereo image, in addition to elimination of data redundancy in spatial domains and time domains through intra-frame prediction and inter-frame prediction, redundancy of spatial domain data between multi-channel images also has to be eliminated. The parallax estimation and compensation are key technologies in the stereo video encoding, so as to eliminate spatial domain redundancy between multi-channel images. The core of the parallax estimation and compensation is to find correlation between two (or more than three) images. The content of the stereo video encoding here includes a color image and a depth value corresponding to the color image, and layered encoding can be adopted, that is, the color image is hybrid encoded and placed in a base layer and a depth value is hybrid encoded and placed in an enhancement layer.

In this embodiment, the transmission interface module 64 is configured to send the encoded local target content and depth value thereof, receive an encoded remote target content and depth value thereof transmitted by a remote end, and send the remote target content and depth value to the decoding module for decoding. In this embodiment, the transmission interface module 64 may be various wired or wireless interfaces that can realize transmission, for example, a broadband interface, a Bluetooth interface, an infrared interface or an access technology using a mobile communication network of mobile phones. In this embodiment, the transmission interface module only needs to transmit the local target and a depth value thereof in the local scene contents, a data amount of which is reduced compared with the original local scene content, so as to reduce a bandwidth occupancy rate during data transmission.

In this embodiment, after being received by the transmission interface module 64 of the video communication apparatus, the remote target content and the depth value thereof can only be displayed after processing.

The decoding module 65 is configured to decode the received remote data, so as to obtain the remote target content and the depth value corresponding to the remote target content.

The synthesis module 66 is configured to synthesize the decoded remote target content and the local background content according to the depth values, so as to obtain a color image after the remote target content and the local background are synthesized and a depth value corresponding to the color image. The local background content is extracted by the extraction module 69. In the synthesis process, a blockage relation is determined first according to the depth value of the remote target content and the depth value of the local background content, and subsequently contents of the corresponding color image are synthesized according to the blockage relation. When the display module 67 is a 3D stereo display apparatus, a virtual image in another viewpoint needs to be further reconstructed according to the synthesized contents of the color image and the depth value corresponding to the color image, so that in this embodiment the present invention further includes a view reconstruction module 68, which is configured to perform view reconstruction on the synthesized image content, so as to generate a virtual viewpoint image. The virtual viewpoint image and the synthesized color image form a stereo view, which is sent to the 3D stereo display apparatus to realize stereo display.

Figure 8:
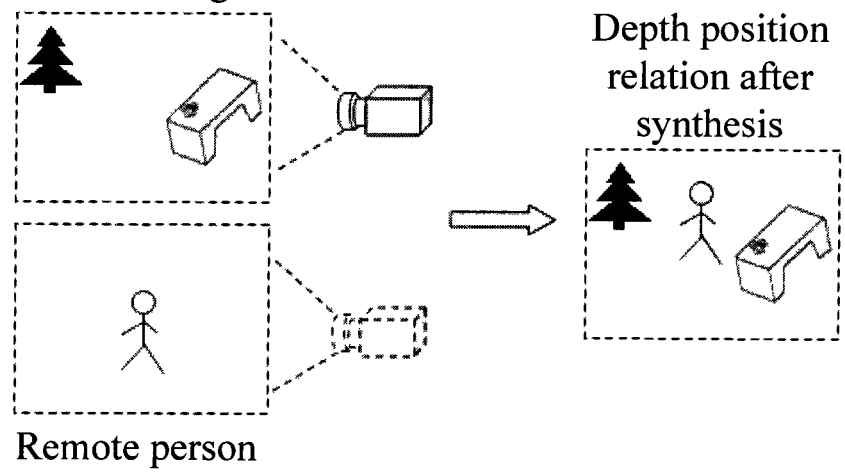
FIG. 8 is a schematic view of a process for synthesizing a scene content according to the second embodiment of the present invention.

As shown in FIG. 8, a received remote target content (a person) is given, a depth of the remote target content is illustrated, a local background content (a tree and a desk) acquired locally by using a depth camera is given, and a depth of the local background content is illustrated. Subsequently, synthesis is performed according to a depth relation, so as to obtain a synthesized scene. As distances of the remote target content and the local background content relative to the camera are obtained, the remote person can be inserted between the local desk and tree.

In order to make the synthesized image more natural, the following problems need to be solved.

(1) Problem of scaling a remote target content: in order to synthesize a remote person and the local background content perfectly, a scaling unit 661 is needed to adjust a position of the remote target content relative to the camera. At this time, a size of the remote target content needs to be scaled. When the remote target content needs to be drawn to a nearer distance, that is, when the depth value is decreased, the remote target content needs to be scaled up. When the remote target content is arranged at a farther distance, that is, when the depth value is increased, the remote target content needs to be scaled down. As the remote target content is a single target, a range of the depth change is limited, so that when the image is scaled, a perspective scaling relation can be simplified into linear scaling consistent with a depth of the image.

(2) Problem of mutual blockage between the remote target content and the local background content: when the remote target content and the local background content are synthesized, the problem of mutual blockage needs to be considered with the synthesis unit 662. According to the scaled depth value of the remote target content and the depth value of the local background content, a blockage relation between the scaled remote target content and the local background content is determined. When horizontal and vertical positions of pixel points overlap, a pixel point having a smaller depth value blocks a point having a larger depth value (a near view blocks a distant view). According to the blockage relation between the scaled remote target content and the local background content, the scaled remote target content and the local background content are synthesized into a scene content.

(3) Hole filling problem: a hole might exist in the local background content obtained after the local target content is eliminated, and the hole might still exist after the local background content and the remote target content are synthesized. Two solution modes are provided:

In a first solution, another group of cameras are used to acquire and photograph a content of a scene opposite to the local target, which is usually a scene content that a person views. During synthesis, the content of the scene is directly synthesized with the remote target content. This mode has a good effect, that is, a background that the person views is synthesized with a remote person. As the opposite scene is directly used, the hole filling problem does not exist. However, a group of cameras must be added at each end of the video communication.

In another solution, a residual local background content after the local target content is eliminated is used, and possible holes are filled through a method of edge pixel filling.

In this embodiment, when the video communication apparatus adopts a 3D stereo display apparatus and the display apparatus only supports the display of input left and right images, another image needs to be reconstructed, so as to realize stereo display. Some automatic stereo displays support 3D stereo display of a 2D color image with a depth value corresponding to the color image, so that another image does not need to be reconstructed. Instead, the automatic stereo display accomplishes reconstruction of the other image, and corresponding hole filling is accomplished in the reconstruction process, for example, a philips stereo display.

The view reconstruction is also referred to as virtual viewpoint image synthesis, which usually means to reconstruct an image in another view angle from a model or an image in a different angle. In this embodiment, the view reconstruction module 68 realizes the reconstruction. When a depth of an image is known, a parallax between a virtual viewpoint view and a known view can be calculated according to the following formula:

$$d = A1O1' - A2O2' = f*(CO1 - CO2)/Z = f*B/Z$$

where d is the parallax between the virtual viewpoint view and the known view, f is a focal length of the camera, B is a distance between the virtual viewpoint and an original photographing point, and Z is a depth of the image.

When a right image is reconstructed based on the synthesized image and a depth thereof, a color of a pixel on a certain scanning line $x_r$ in the right image is determined by a color of a pixel on a corresponding scanning line $x_l$ in a left image (a synthesized image). A coordinate of $x_l$ is determined according to the following equation:

$$x_l = x_r + d = x_r + \frac{fB}{Z}$$

When the synthesized view content is determined according to the foregoing formula, points corresponding to some points in the right image cannot be found in the left image due to the blockage, that is, the hole problem occurs. Similarly, a pixel point at an edge of the hole is used for filling the hole, and the filling can be performed through a bilinear interpolation mode.

In this embodiment, the display module is configured to display the synthesized image. The display module 67 may be a stereo display apparatus such as an automatic stereo display apparatus, a pair of stereo glasses, and a holographic display apparatus capable of 3D stereo display, so as to realize stereo display of a stereo image, so that a user experiences the depth of a scene and feels the stereo effect. When the stereo display is needed, the view reconstruction and the hole filling usually need to be accomplished. In this embodiment, the display module may also be a normal 2D display apparatus, which only displays a 2D synthesized image. When only a 2D image needs to be displayed, the view reconstruction is not needed and the synthesized 2D image is displayed directly.

Embodiment Three

Figure 10:
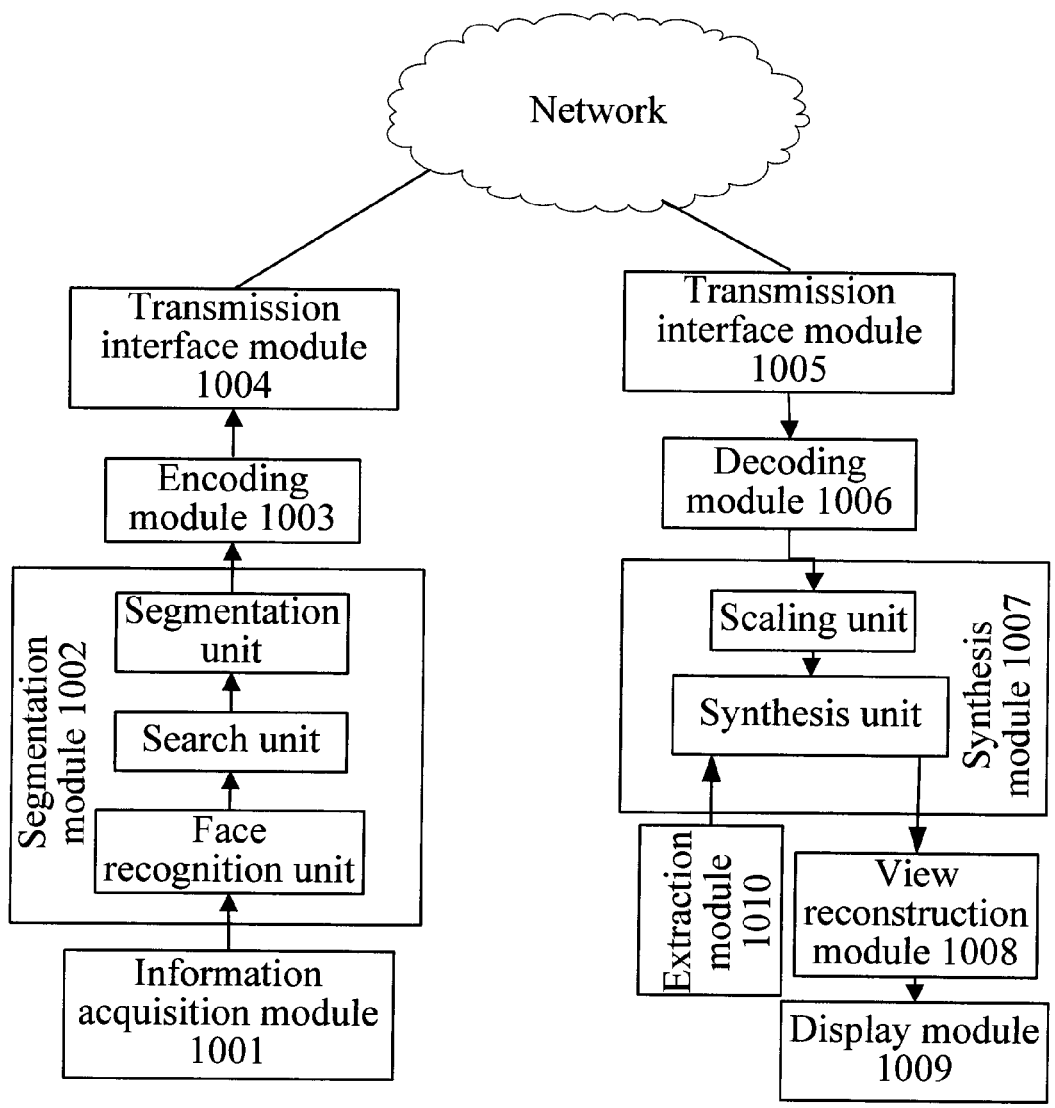
FIG. 10 is a structural view of a video communication system according to the third embodiment of the present invention.

In this embodiment, an example of a communication process in the video communication system is provided, which is specifically a whole process that two users (A and B) communicate through the video communication apparatus in second embodiment and the user A sends a video data to the user B and the user B receives the video data of the user A in the communication process. A structure of the video communication system is as shown in FIG. 10, which includes a sending end and a receiving end. The sending end and the receiving end are connected through a network.

The sending end is configured to acquire a scene content and a depth value thereof of the sending end, segment a target content of the sending end from the scene content of the sending end according to a depth value of the scene content of the sending end, and send the target content of the sending end and a depth value thereof to the receiving end. The sending end includes an information acquisition module 1001, a segmentation module 1002, an encoding module 1003, and a transmission interface module 1004. The information acquisition module 1001 is configured to photograph local scene contents and calculate depth values corresponding to the local scene contents or acquire the depth values corresponding to the local scene contents directly. The segmentation module 1002 is configured to segment the local target content from the local scene contents according to the depth value. The encoding module 1003 is configured to encode the segmented local target content and a depth value corresponding to the local target content. The transmission interface module 1004 is configured to send the local target content and the depth value thereof to the receiving end.

The receiving end is configured to receive a target content and a depth value thereof sent by the sending end, acquire a background content and a depth value thereof of the receiving end, and synthesize the target content of the sending end and the background content of the receiving end into a scene content according to the depth values. The receiving end includes a transmission interface module 1005, a decoding module 1006, a synthesis module 1007, a view reconstruction module 1008, a display module 1009, and an extraction module 1010. The transmission interface module 1005 is configured to receive a target content and a depth value thereof sent by a remote end. The decoding module 1006 is configured to decode the received remote target content and a depth value thereof. The synthesis module 1007 is configured to synthesize the decoded remote target content and the local background content and generate a stereo view according to the corresponding depth values, in which the local background content may be a residual content after the local target content in the local scene contents is segmented. The extraction module 1010 is configured to extract the residual content; the local background content may also be a scene content opposite to the local target photographed by using another group of cameras. The display module 1009 is configured to display the synthesized image, which may be a stereo display apparatus or a normal 2D display apparatus; if the display module 1009 is a stereo display apparatus, a 2D image in another viewpoint needs to be reconstructed. The reconstruction of the 2D image in another viewpoint can be accomplished by using the view reconstruction module 1008.

Figure 9A:
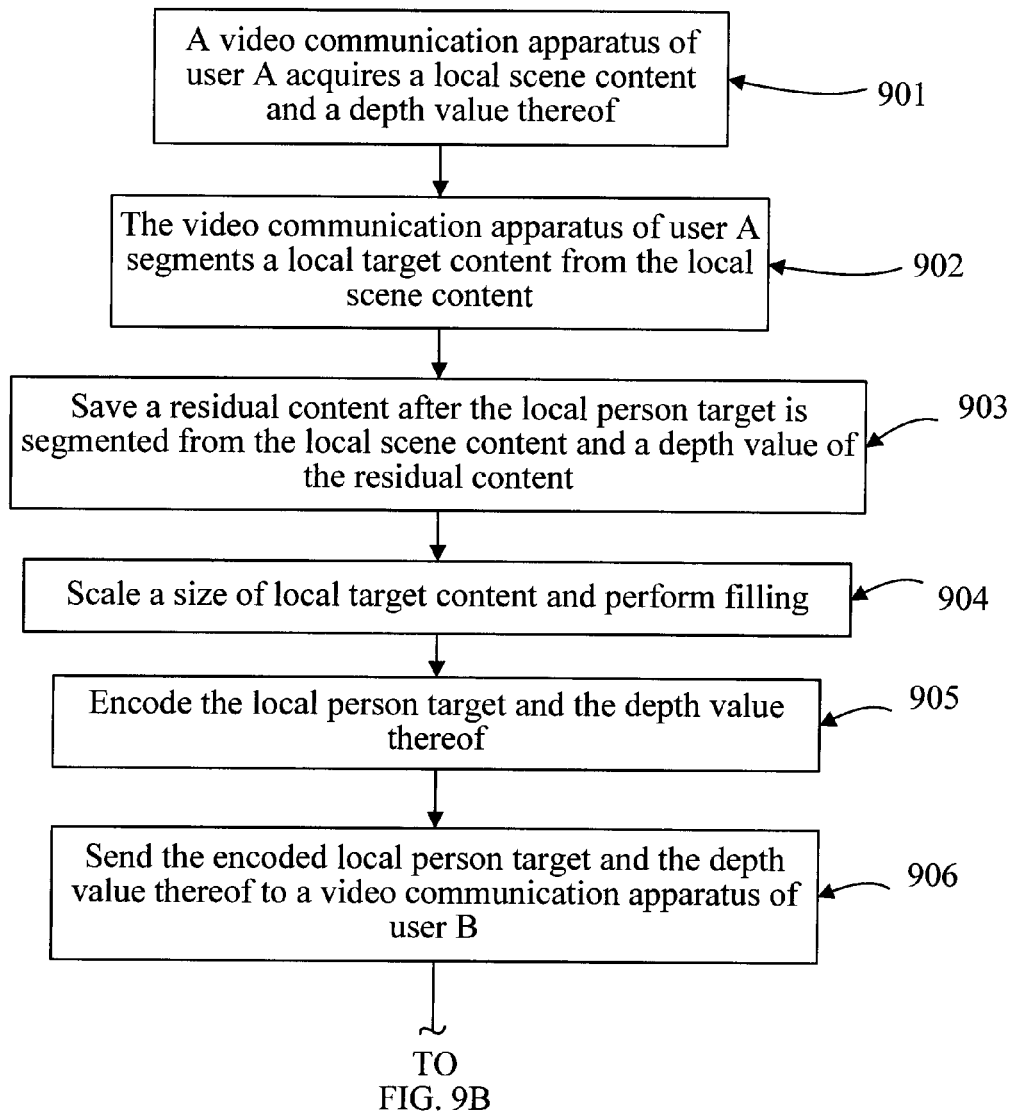
FIGS. 9A and 9B are a flow chart of video communication according to a third embodiment of the present invention.
Figure 9B:
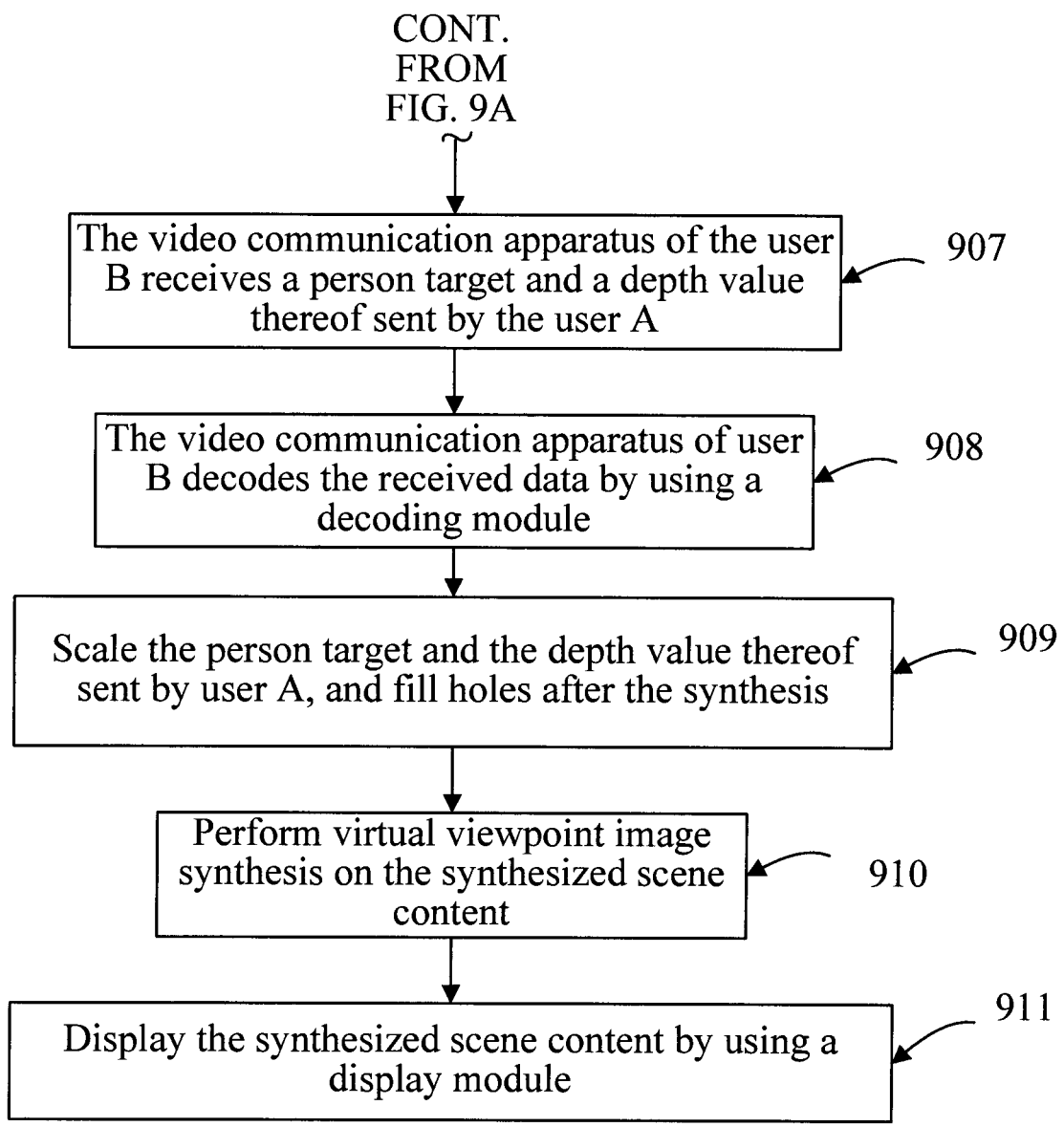

The communication process is as shown in FIG. 9, which specifically includes the following steps.

In Step 901, an information acquisition module of a video communication apparatus of a user A acquires local scene contents and depth values thereof. The local scene contents and the depth values of the scene contents can be acquired by using a depth camera or a stereo camera. The depth camera can acquire a depth directly through infrared rays. The stereo camera usually acquires the scene content by using two cameras in parallel and subsequently a depth value of each pixel in the scene content is calculated. The calculation formula is $Z=fB/\Delta x$, where f is a focal length, B is a distance between the two cameras, and $\Delta x$ is a difference of positions of each pixel in two cameras.

In Step 902, the segmentation module of the video communication apparatus of the user A segments the local target content from the local scene contents, which specifically includes the following steps. A face recognition unit in the segmentation module performs face recognition on the photographed local scene content to obtain a position of a face image, and subsequently a search unit in the segmentation module searches for a depth value corresponding to the position of the face image in the depth values of the local scene contents and determines a range of the depth value of a person in the photographed picture according to the found depth value. Thus, a region of the local target content in the scene content can be determined. Finally, the segmentation unit in the segmentation module segments a person target from the local scene contents according to the determined region.

In Step 903, after a local person target is segmented, a residual content after the local person target is segmented from the local scene contents and a depth value of the residual content can be saved. Also, another camera may be used to acquire and save a background content opposite to the person target and a depth value thereof at the same time.

In Step 904, in order to make a size of a local target person uniform, a local person target needs to be scaled up to a size of an original acquisition picture or tailored into a picture in other sizes. Hole regions resulted from tailoring can be filled with a value 0.

In Step 905, the local person target and the depth value thereof obtained in Step 904 are encoded, respectively. Layered encoding is preferred as the data amount that needs to be transmitted in layered encoding is small.

In Step 906, the encoded local person target and the depth value thereof are sent to the video communication apparatus of the user B through the transmission interface module.

Through the foregoing steps, the sending operations of the user A are completed. In the following steps, a user B receives data and the data is processed.

In Step 907, a video communication apparatus of the user B receives a person target and a depth value thereof sent by the user A through a transmission interface module.

In Step 908, the video communication apparatus of the user B decodes the received data by using a decoding module, so as to obtain a person target and a depth value thereof of the user A. At the same time, the video communication apparatus of the user B further needs to acquire a background content and a depth value of the background content. Generally speaking, a residual content after the local target in the local scene contents is eliminated can be used as the background content. If another camera acquires a background content opposite to the user B and a depth value thereof, the user B can view more natural pictures, and the hole problem does not occur during image synthesis.

In Step 909, a scaling unit in the synthesis module scales the person target and the depth value thereof sent by the user A, so as to obtain a person target having an optimal size. When the remote target content needs to be drawn to a nearer distance, that is, when a depth value is decreased, the remote target content needs to be scaled up. When the remote target content is arranged at a farther distance, that is, when the depth value is increased, the remote target content needs to be scaled down.

Subsequently, a blockage relation between a remote person target and a local background content is determined according to a depth value of a person target after scaling and the depth value of the background content of the user A. A blockage principle is as follows. When horizontal and vertical positions of the pixel point overlap, a pixel point having a small depth value blocks a point having a large depth value (a near view blocks a distant view).

A synthesis unit in the synthesis module then synthesizes the person target and the background content into a scene content according to the determined blockage relation.

If the background content is a residual content after the target content is eliminated, pixel filling needs to be performed on the holes in the synthesized scene content. If the background content is a scene opposite to the user B acquired directly, the pixel filling is not needed.

In Step 910, the view reconstruction module performs virtual viewpoint image synthesis on the synthesized scene content, which is specifically to calculate a parallax between a virtual viewpoint view and a known view according to the following formula.

$$d=A1O1'-A2O2'=f*(CO1-CO2)/Z=f*B/Z$$

where d is the parallax between a virtual viewpoint view and the known view, f is a focal length of the camera, B is a distance between the virtual viewpoint and an original photographing point, and Z is a depth of the image.

When a right image of the synthesized image is reconstructed based on the synthesized image and the depth thereof, a color of a pixel on a certain scanning line $x_r$ in the right image is determined by a color of a pixel on a corresponding scanning line in a left image (a synthesized image) $x_l$. A coordinate of the $x_l$ is determined through the following formula.

$$x_l = x_r + d = x_r + \frac{fB}{Z}$$

After the view is reconstructed, pixel filling needs to be performed on holes in the scene content after synthesis of the virtual viewpoint image.

In Step 911, the synthesized scene content is displayed by using a display module such as an automatic stereo display apparatus, a pair of stereo glasses or a holographic display apparatus capable of 3D stereo display, so as to realize stereo display of a stereo image, or only a 2D synthesized image is displayed by using a normal 2D display apparatus.

In this embodiment, in the video communication system, the apparatus of the user A can further include a video receiving device, and the apparatus of the user B can further include a video preprocessing device, so as to ensure that the user B can send video data to the user A. If the user B needs to send the video data to the user A, the process is the same as that in FIG. 9 and only the sender and receiver are exchanged. This embodiment of the present invention is mainly used in video communication, such as normal video chat, business video telephony, and video conference.

Embodiment Four

Figure 11:
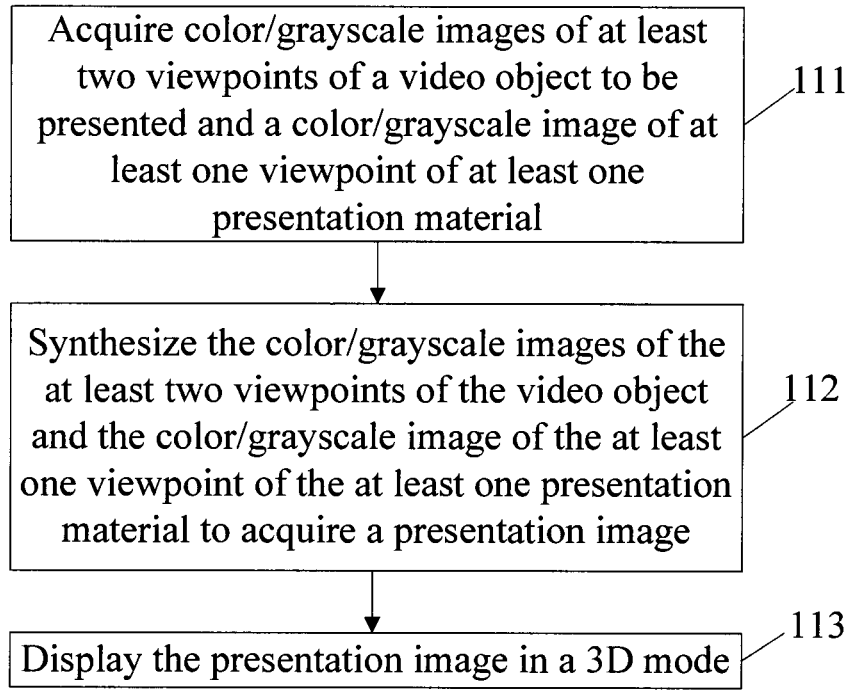
FIG. 11 is a flow chart of a video preprocessing method according to a fourth method embodiment of the present invention.

In an embodiment, the present invention provides a video processing method. As shown in FIG. 11, the method includes the following steps.

In Step 111, color/grayscale images of at least two viewpoints of a video object to be presented and a color/grayscale image of at least one viewpoint of at least one presentation material are acquired.

In Step 112, the color/grayscale images of the at least two viewpoints of the video object and the color/grayscale image of the at least one viewpoint of the at least one presentation material are synthesized to acquire a presentation image.

In Step 113, the presentation image is displayed in a 3D mode.

In an embodiment, the present invention provides a technical solution. By acquiring the multi-viewpoint color/grayscale images of the video object and the color/grayscale image of the presentation material, the presentation image is generated. The presentation image supports a 3D display mode and then the presentation image is displayed in the 3D mode, so as to solve the problem that only 2D video presentation is supported in the prior art, thereby achieving the 3D video presentation.

In order to illustrate the technical solution of the embodiment of the present invention more clearly, in the following the stereo video/3D video technology in the embodiment of the present invention is briefly illustrated.

The conventional video technology only provides 2D information. However, in the embodiment of the present invention, by using a 3D video technology, a user as a viewer can not only learn information related to the scenery content but also obtain depth information such as distances and positions of the scenery.

The 3D video technology can provide a picture that conforms to a stereo vision principle and has depth information, so as to reproduce scenes of the subjective world vividly and present a feeling of depth, a feeling of layers, and naturalness of the scene, which is an important orientation of development of the current video technology.

The basic principle of the 3D video technology is to simulate imaging principles of human eyes. A left-eye image and a right-eye image are obtained by using dual cameras. During presentation, a person is enabled to view the left-eye and right-eye images with the left and right eyes respectively, so as to synthesize an image having stereo sensation finally, so that an observer can feel a depth of the scene. Therefore, the two-eye stereo video can be considered as depth information added to the existing 2D video.

In a portion of acquiring the color/grayscale images of the at least two viewpoints of the video object to be presented, video technologies such as multi-viewpoint video (MVV)/free viewpoint video (FVV) are adopted. A basic idea of the MVV technology is to photograph scenes at the same time by using more than two cameras. For example, for a scene of sports or drama, different cameras have different photographing angles, so that more than two video streams are generated. The video streams having different viewpoints are sent to a user terminal. The user can select a random viewpoint and direction to watch the scene. The viewpoint may be a predefined photograph viewpoint of a fixed camera or a virtual viewpoint, and an image in the virtual viewpoint is obtained by synthesizing images photographed by actual cameras around.

Embodiment Five

Figure 12:
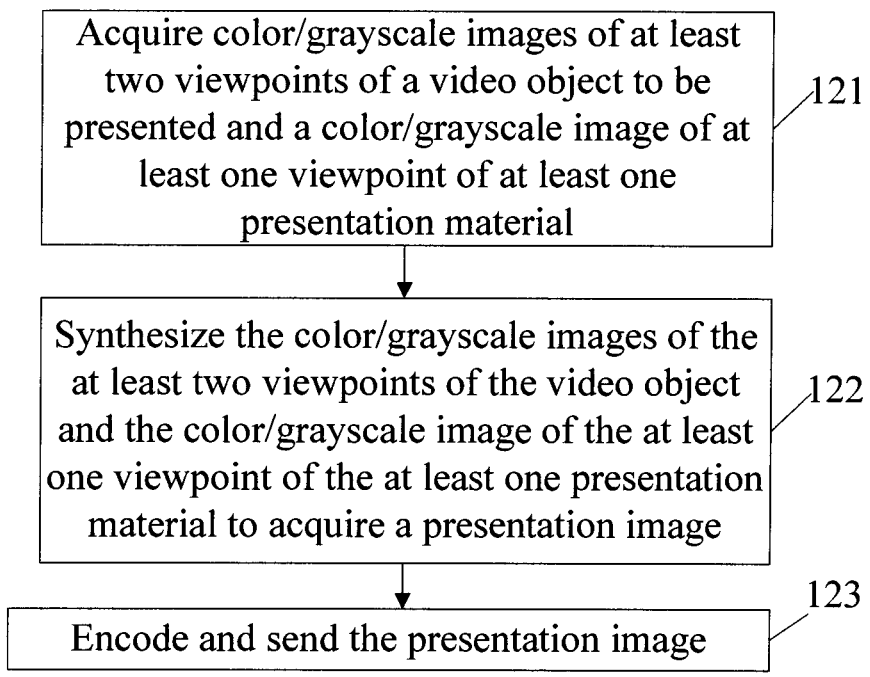
FIG. 12 is a flow chart of a method for sending video presentation according to a fifth method embodiment of the present invention.

In an embodiment, the present invention provides a video sending method. As shown in FIG. 12, the method includes the following steps.

In Step 121, color/grayscale images of at least two viewpoints of a video object to be presented and a color/grayscale image of at least one viewpoint of at least one presentation material are acquired.

The video object to be presented includes an object such as a person and an object serving as a foreground after a nature scene is segmented or also can be a background object. The presentation material can be a content such as a document, a picture, a video or a graph generated by a computer that is to be presented.

In an embodiment, the present invention provides the method for acquiring the color/grayscale images of the at least two viewpoints of the video object, which includes the following steps.

In Step 1210, depth information and at least one color/grayscale image at the same viewpoint of the scene in which the video object is located are acquired.

More than two normal color cameras can be used to acquire a depth image through a method based on image matching. In consideration of complexity and poor real-time performance of the algorithms in the method, preferably, in the embodiment of the present invention, the depth information is acquired by using a camera that can acquire depth information of a scene, and a color/grayscale image is acquired by using a camera that can acquire a color/grayscale image of a scene. In the following, operating principles of the two cameras are briefly illustrated.

Figure 13:
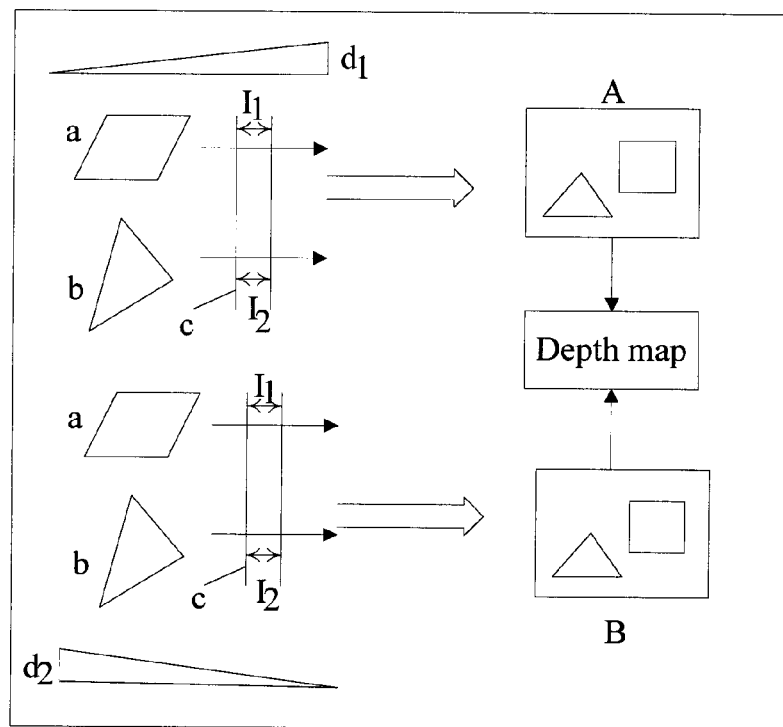
FIG. 13 is a schematic principle view of a camera for acquiring depth information according to the fifth method embodiment of the present invention.

FIG. 13 is a schematic principle view of acquiring a depth image by using a camera equipped with a charge coupled device (CCD) of an ultra-high speed shutter and an intensity-modulated illuminator. An object a and an object b exist in the scene, and the object a is a square object and the object b is a triangle object. In FIG. 13, $I_1$ and $I_2$ are light intensities of the objects a and b acquired by the camera when the shutter is opened (as shown by c in FIG. 13) respectively, $d_1$ and $d_2$ represent a modulated light with increasing intensity and a modulated light with decreasing intensity respectively.

The instantaneous light intensity $I_1$ of a reflected light transmitted from the closer object a to the camera is detected by the ultra-high speed shutter of a detection device in the camera, square distribution in the image A is obtained, and triangle distribution in the image A is obtained for a reflected light of the object b. As the object a is closer to the camera, the instantaneous light intensity $I_1$ detected by the camera is higher than the instantaneous light intensity $I_2$, and the brightness of the square image is higher than that of the triangle. Therefore, the depth of the object can be detected through a difference of brightness of the captured image A. However, the brightness of the reflected light of the object is influenced by parameters such as reflectivity of the object, a distance between the object and the camera, a modulation index of a light source, and spatial unevenness of illumination. At this time, an image B can be obtained by linearly decreasing the light intensity spatial distribution. The image A and the image B are combined, and adverse influences can be eliminated through a signal processing algorithm, so as to obtain a precise depth map. In the depth map, a depth of the object b (the triangle object in FIG. 13) is greater than a depth of the object a (the square object in FIG. 13), that is, visually, the object a is closer to the camera and the object b is farther away from the camera.

Optionally, in the embodiment of the present invention, the depth information can be acquired by using the camera and a camera for acquiring the color/grayscale image. Alternatively, a camera that can directly acquire the depth information and the color/grayscale image at the same time is adopted.

Figure 14:
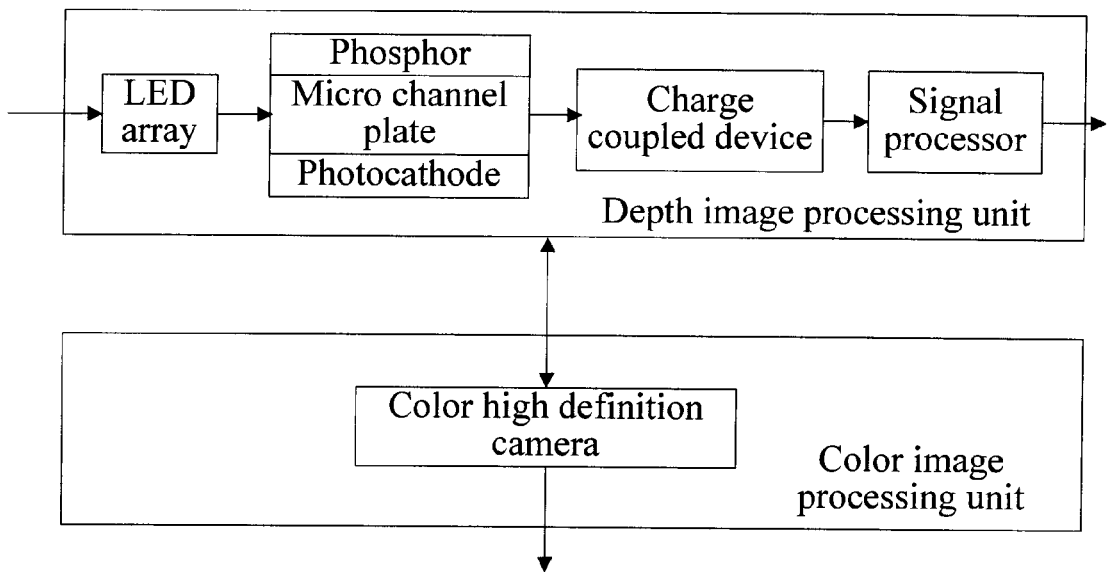
FIG. 14 is a schematic structural view of a camera for acquiring depth information and a color/grayscale image according to the fifth method embodiment of the present invention.

FIG. 14 is a schematic view of a basic structure of a high definition (HD) Axi-vision camera. The camera can acquire the depth information and the color/grayscale image at the same time. The HD Axi-Vision camera system includes a depth image processing unit and a color image processing unit. A near infrared LED array is used for an intensity-modulated illuminator, which is capable of rapid direct modulation. A wavelength of a light emitted by the near infrared LED array is 850 nm which is beyond the range of visible light, so that the visible light is not interfered. Four LED arrays can be disposed around a lens of the camera, so as to illuminate the photographed scene uniformly. At the same time, a visible light source such as a fluorescent source can be further provided, which is configured to irradiate the object to be photographed. The light source has a spectrum that exceeds a region of the near infrared light.

When the reflected light of the object passes through a dichroic prism of the lens of the camera, the visible light and the near infrared light are separated. The visible light enters the color image processing unit and is processed by the color image processing unit, so as to obtain a color image of the object, that is, a 2D image. The color image processing unit may be a color HD camera. The near infrared light passes through the depth image processing unit and is processed, so as to obtain a depth image of the object. In the depth image processing unit, the near infrared light separated by the dichroic prism is focused onto a photocathode at the same time. A short-pulse bias is applied between the photocathode and a micro channel plate (MCP), so as to realize a shutter speed of one billionth of a second. A frequency of opening the shutter is the same as a frequency of the light ray modulation, so as to obtain a better signal to noise ratio (SNR). By opening the shutter, an optical image of the object is obtained on a phosphor. The optical image then passes through a relay lens and is focused on a high resolution progressive CCD camera, and is converted into a photoelectron image, and eventually the photoelectron image forms the depth map of the object through a signal processor.

In the foregoing description two preferable methods for acquiring depth information and a color/grayscale image are provided. However, the embodiments of the present invention are not thus limited. All other similar and relevant methods for acquiring the depth information and the color/grayscale images shall fall within the protection scope of the embodiments of the present invention.

In Step 1211, according to the acquired depth information in a viewpoint, video segmentation is performed on a color/grayscale image in the same viewpoint to acquire the video object.

The video segmentation may be performed through more than one method. A video image is divided into a foreground and a background, for example, through a chroma-key segmentation technology, a depth-key segmentation technology or a segmentation technology that detects a difference between a current image and a background image photographed in advance. The first and the third technologies have more limit conditions for the scene. Preferably, in the embodiment of the present invention, the video segmentation is performed through the depth-key segmentation technology, which mainly includes the technical key points as follows.

A binarized depth mask is generated through a threshold value according to the depth map, and the video object is extracted according to the mask. For example, a pixel having a mask value of 1 is a foreground object pixel and a pixel having a mask value of 0 is a background object pixel, so that the video object can be extracted or eliminated according to the mask values.

A chain-code description is constructed for a border of the depth mask. A contour of the foreground object is recovered according to the chain-code description. A processing region is defined according to the contour of the object as a region of Alpha synthesis.

In Step 1212, at least one color/grayscale image in another viewpoint of the video object is generated according to the depth information of the viewpoint and the color/grayscale image of the same viewpoint.

In the following, the technology for generating a multi-viewpoint image used in the embodiment of the present invention is briefly described.

A certain pixel point P=[X,Y,Z] in space is projected to a point [x,y] in a 2D image plane of the camera, which satisfies the following equations:

$$x = F\frac{X}{Z}, \quad y = F\frac{Y}{Z},$$

where the F is a focal length of the camera.

It is assumed that both pixel points $P_1=[X_1,Y_1,Z_1]$ and $P_2=[X_2,Y_2,Z_2]$ in the space are projected onto a camera pair. One camera is located at [0,0,0] (a left camera) and another camera is located at [B,0,0] (a right camera). The focal lengths of the two cameras are equal and both are F, which are at parallel positions, and satisfy the following equations:

$$x_{L,1} = F\frac{X_1}{Z_1}; \quad x_{L,2} = F\frac{X_2}{Z_2}; \quad x_{R,1} = F\frac{X_1 - B}{Z_1}; \text{ and } x_{R,2} = F\frac{X_2 - B}{Z_2}$$

where $x_{L,1}$ and $x_{L,2}$ are positions of the $P_1$ and $P_2$ points obtained by the left camera respectively, and $x_{R,1}$ and $x_{R,2}$ are positions of the $P_1$ and $P_2$ points obtained by the right camera respectively, so that depths of the $P_1$ and $P_2$ points (that is, a parallax) satisfy the following equation:

$$d_i = x_{Li} - x_{Ri} = Fi \cdot \left[\frac{X_i}{Z_i} - \frac{X_i - B}{Z_i}\right] = \frac{F \cdot B}{Z_i} \Rightarrow x_{Ri} = x_{Li} - d_i,$$

wherein i is 1 or 2.

It can be seen from the above that as long as $x_L$ and d are known, the value of the $x_R$ can be calculated.

In the embodiment of the present invention, $x_L$ is obtained through a color/grayscale image of the depth camera, and d can be calculated through the depth map, so that a color/grayscale image of the video object in another viewpoint can be generated.

As the depth is usually not an integer, in the embodiment of the present invention, a subpixel level is adopted for the calculated pixel positions. At this time, brightness and chroma values of a corresponding new pixel can be determined through a weighted average method according to brightness and chroma values of a pixel adjacent to a certain pixel in the original image.

Through the method, more than two color/grayscale images in different viewpoints of the video object can be generated.

In order to ensure acquisition of high-quality color/grayscale images, when the multi-viewpoint image is generated, "blockage" and "hole" problems caused by viewpoint changes in the image need to be solved. In the following, the method for solving problems of the "blockages" and "holes" in the embodiment of the present invention is briefly illustrated.

Figure 15:
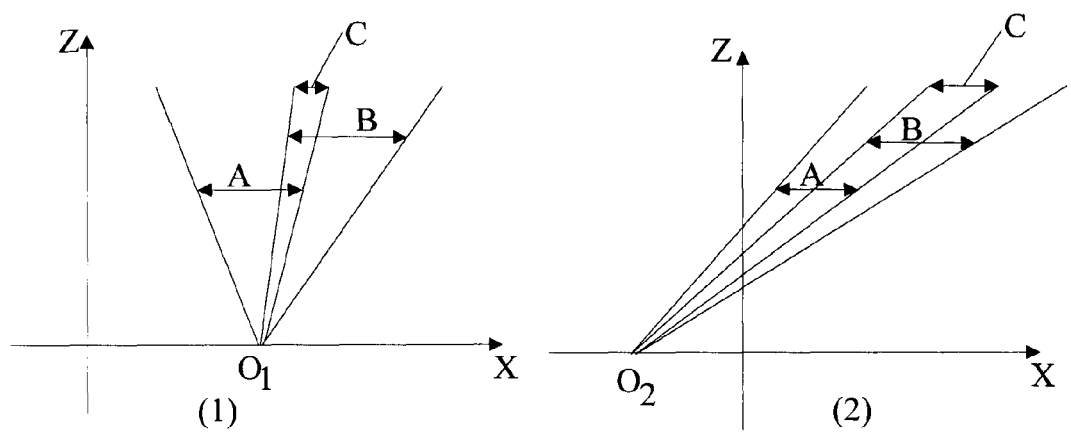
FIG. 15 is a schematic view when blockage occurs according to the fifth method embodiment of the present invention.

FIG. 15 shows a situation that "blockage" occurs when a multi-viewpoint image is generated. FIG. 15(1) on the left shows a situation of observing the scene at an original image viewpoint $O_1$, and FIG. 15(2) on the right shows a situation of observing the scene at a new viewpoint $O_2$ where the image needs to be reconstructed. When the scene is observed at the $O_1$ on the left, a front object (as shown by A in FIG. 15) blocks a small portion of a rear object (as shown by B in FIG. 15), and C in FIG. 15 represents a blockage region. When the scene is observed at $O_2$ on the right, the blockage region of the rear object by the front object is enlarged, so that a portion in the image obtained at the $O_1$ cannot be displayed in the image at the $O_2$. Therefore, in the pixel mapping process, it needs to be determined whether a pixel is blocked. If the pixel is not blocked, the pixel mapping is performed. If the pixel is blocked, the processing is skipped.

Figure 16:
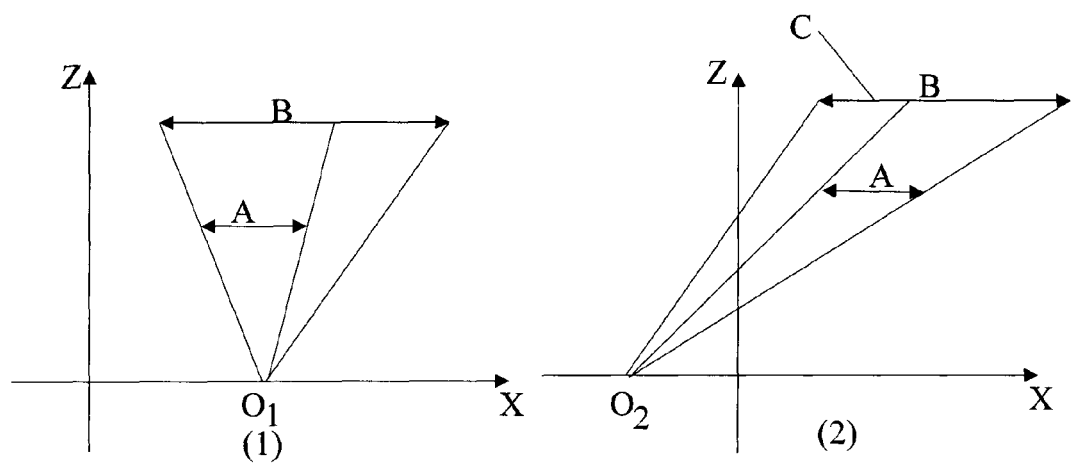
FIG. 16 is a schematic view when a hole occurs according to the fifth method embodiment of the present invention.

FIG. 16 shows a situation that a "hole" occurs when a multi-viewpoint image is generated. FIG. 16(1) on the left shows a situation of observing a scene at the original image viewpoint $O_1$, and FIG. 16(2) on the right shows a situation of observing a scene at a new viewpoint $O_2$ where the image needs to be reconstructed. At the $O_1$ position on the left, due to the blockage of the rear object (as shown by B in FIG. 16) by the front object (as shown by A in FIG. 16), a left portion of the rear object cannot be observed, so that the image generated at $O_1$ does not have pixels in this portion. When the scene is observed at the new position $O_2$ on the right, a left portion of the rear object is not blocked; however, as the image generated at $O_1$ does not have pixels in this portion, the image generated at the $O_2$ lacks hole regions corresponding to the image pixels at the $O_1$ (as shown by C in FIG. 16).

In order to process the holes, all pixels in a new image are set to special color values before the new image is generated. After the mapping process is completed, regions having special color values still kept in the image are hole regions. For a small hole region, corresponding information of pixels in the hole region can be determined according to depth, brightness, and chroma information of pixels around the hole, and the hole region is repaired, for example, through a linear or non-linear interpolation method. For a large hole, a motion compensation method can be adopted, in which pixel information corresponding to the hole region is searched from a video frame sequence before the currently reconstructed frame, and the hole region is repaired accordingly.

The method of acquiring the color/grayscale images of the at least two viewpoints of the video object to be presented is also suitable for acquiring the color/grayscale image of the at least one viewpoint of at least one presentation material.

In Step 122, the color/grayscale images of the at least two viewpoints of the video object and the color/grayscale image of the at least one viewpoint of the at least one presentation material are synthesized to acquire a presentation image.

The image synthesis is to seamlessly integrate the segmented foreground object into the background. Optionally, the background here may be a color/grayscale image generated from the presentation material through the multi-viewpoint image or a color/grayscale image of a viewpoint of the presentation material. In the method in the embodiment of the present invention, alpha value synthesis is performed on edges of the foreground object and the background based on the depth image. The method mainly includes the technical key points as follows.

First, a region to be processed is defined. The processing region is mainly located near a border of the foreground object, which is a rectangular region with the chain-code point as a center.

A size of the processing region is related to sharpness of edges of the foreground object. The sharpness of the edges of the foreground object is obtained by calculating a derivative in a vertical direction of the object edges. A transition region from a foreground having sharp edges to the background is small, so that the region to be processed is small. A blurred region is gradually transitional from a foreground to a background, so that a region to be processed is large.

At a border of the defined processing region, it is assumed that all pixel points are either in a foreground object (an opaque alpha value, and a pure foreground color) or outside the foreground object (a transparent alpha value, and a pure background color). In the processing region, the pixel point is hybrid of the foreground and the background, which has a semi-transparent alpha value and a color value I(i,j) of the pixel point is the hybrid of the foreground color F(i,j) and the background color B(i,j):

$$I(i,j)=\alpha*F(i,j)+(1-\alpha)*B(i,j)$$

A color value I(i,j) of a certain pixel point in the processing region can be calculated through estimation of the alpha value α.

Although the key technology of image synthesis adopted in the embodiment of the present invention is described above, the technology is not thus limited, and other methods can be adopted for image synthesis.

Optionally, in the embodiment of the present invention, position information of the video object and control command information of the video object can be acquired through the depth information. The color/grayscale images of the at least two viewpoints of the video object and the color/grayscale image of the at least one viewpoint of the at least one presentation material are synthesized to acquire the presentation image.

The position information is acquired through the depth image, and is configured to control the position of the video object in the presentation material. The control command information is configured to control the content of the presentation material and the position of the video object in the presentation material.

The method for acquiring the control command information provided in the embodiment the present invention includes the following steps.

According to the depth image, the gesture from the video object is recognized and the gesture recognition information is converted into the control command information.

By analyzing the depth image, 3D coordinate information of a gesture feature point of the video object in the scene can be obtained. The gesture of the video object is recognized through the 3D coordinate information of the feature points. As the depth map can expand the gesture recognition of the video object into a 3D space, forward and backward motions of the gesture of the video object can also be recognized accurately. The recognition information is converted into the control command information.

Furthermore, in the embodiment of the present invention, depth change information of the video object can further be obtained by detecting the same feature point in different time-domain spaces, and the change information is converted into the control command information.

In order to support remote presentation of the video, in an embodiment, the present invention further includes the following steps.

In Step 123, the presentation image is encoded and sent.

The acquired presentation image is compressed. For example, the H.264 protocol or the Moving Picture Experts Group-4 (MPEG-4) protocol is adopted to encode the presentation image to adapt to limited network bandwidth, and the presentation image is transmitted to a remote end through the network for presentation.

At the receiving end of the network, correspondingly, the compressed image is decoded. For example, at the receiving end the encoded image is decoded according to the H.264 protocol or the MPEG-4 protocol, so as to acquire the presentation image and display the presentation image in a 3D mode. The presentation image can be displayed in the 3D mode through apparatuses such as a pair of stereo glasses, an automatic stereo display or a projector.

In the embodiment of the present invention, the display of the presentation image in a 2D mode is included, so that the 2D and 3D image presentation modes become compatible. In this case, multi-viewpoint image generation of the video object is not needed, and the color/grayscale images of the directly acquired video object and the presentation material are synthesized and displayed in a 2D mode.

Embodiment Six

Figure 17:
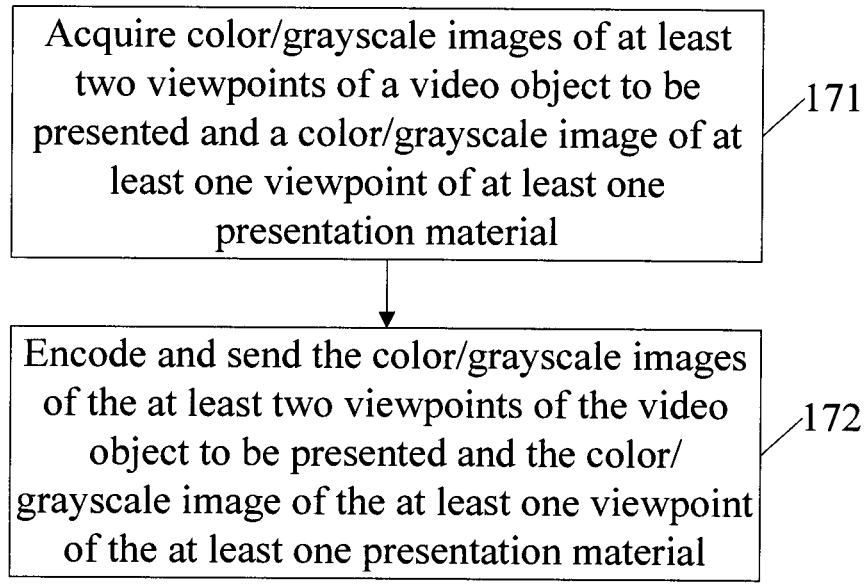
FIG. 17 is a flow chart of a method for sending video presentation according to a sixth method embodiment of the present invention.

In the embodiment, the present invention further provides a video sending method. As shown in FIG. 17, the method is to ensure remote presentation of a 3D video, which includes the following steps.

In Step 171, color/grayscale images of at least two viewpoints of a video object to be presented and a color/grayscale image of at least one viewpoint of at least one presentation material are acquired.

In Step 172, the color/grayscale images of the at least two viewpoints of the video object to be presented and the color/grayscale image of the at least one viewpoint of the at least one presentation material are encoded and sent.

Figure 18:
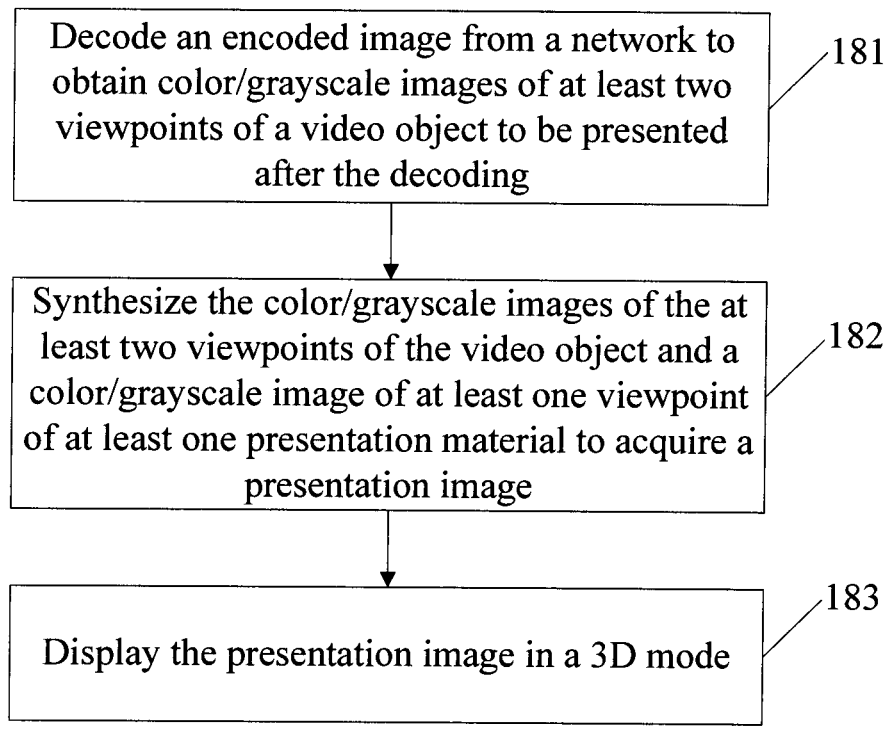
FIG. 18 is a flow chart of a method for receiving video presentation according to the sixth method embodiment of the present invention.

Correspondingly, in the embodiment, the present invention further provides a video receiving method, so as to implement remote presentation of the 3D video. As shown in FIG. 18, the method includes the following steps.

In Step 181, encoded images are acquired, and the acquired encoded images are decoded to obtain color/grayscale images of at least two viewpoints of a video object to be presented and a color/grayscale image of at least one viewpoint of at least one presentation material.

In Step 182, the color/grayscale images of the at least two viewpoints of the video object and the color/grayscale image of the at least one viewpoint of the at least one presentation material are synthesized to acquire a presentation image.

In Step 183, the presentation image is displayed in a 3D mode.

In the embodiment of the present invention, display of the presentation image in a 2D mode is included, so that the 2D and 3D image presentation modes become compatible. In this case, multi-viewpoint image generation of the video object is not needed, and the color/grayscale images of the directly acquired video object and the presentation material are synthesized to display in a 2D mode.

In this specific embodiment of the present invention, the specific methods of Steps 171 and 172 and Steps 181 to 183 are as described in the fifth embodiment, and the main differences are as follows.

In order to implement the remote presentation, in consideration of factors such as the network bandwidth, in the fifth embodiment of the present invention, the sending end mainly processes the acquired video image, such as video segmentation and multi-viewpoint generation, and the sending end encodes the synthesized presentation image for network transmission. The presentation image includes the video object and the presentation material, so as to implement 3D presentation of the decoded image (that is, the presentation image). However, in the sixth embodiment of the present invention, the sending end mainly processes the acquired the video image correspondingly and the sending end only encodes the depth information and color/grayscale images of the video object and the presentation material. The receiving end first decodes the encoded images, the decoded images are then synthesized with the presentation material to generate a presentation image, and the presentation image is displayed in the 3D mode.

In the technical solutions of the embodiment of the present invention, the presentation image is generated by acquiring multi-viewpoint color/grayscale images of the video object and the color/grayscale image of the presentation material, the presentation image supports the 3D display mode, and the presentation image is then displayed in the 3D mode, so as to solve the problem that only 2D video presentation is supported in the prior art, thereby achieving the 3D video presentation.

Embodiment Seven

Figure 19:
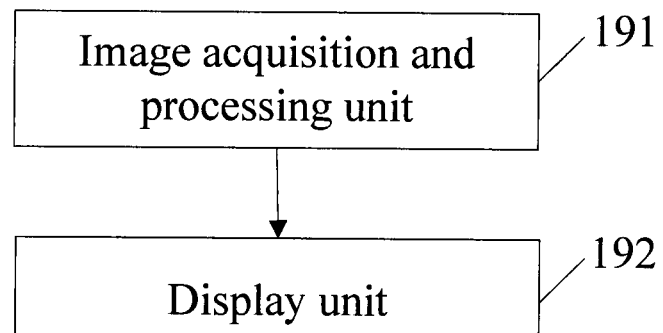
FIG. 19 is a schematic view of a video presentation device according to a fourth device embodiment of the present invention.

In an embodiment, the present invention further provides a video processing device. As shown in FIG. 19, the video processing device includes an image acquisition and processing unit 191 and a display unit 192.

The image acquisition and processing unit 191 is configured to acquire color/grayscale images of at least two viewpoints of a video object to be presented and a color/grayscale image of at least one viewpoint of at least one presentation material, and synthesize the color/grayscale images of the at least two viewpoints of the video object and the color/grayscale image of the at least one viewpoint of the at least one presentation material to acquire a presentation image.

The display unit 192 is configured to display the presentation image in a 3D mode.

The image acquisition and processing unit 191 includes an image acquisition module, a video segmentation module, a multi-viewpoint image generation module, and a synthesis module.

The image acquisition module is configured to acquire depth information and at least one color/grayscale image at the same viewpoint in the scene where the video object is.

The video segmentation module is configured to perform video segmentation on the color/grayscale image at the same viewpoint according to the acquired depth information of a viewpoint, so as to acquire the video object.

The multi-viewpoint image generation module is configured to generate a color/grayscale image of at least one other viewpoint of the video object according to the acquired depth information of a viewpoint and the color/grayscale image of the same viewpoint.

The synthesis module is configured to synthesize the color/grayscale images of the at least two viewpoints of the video object and the color/grayscale image of the at least one viewpoint of the at least one presentation material, so as to acquire a presentation image.

In the technical solution provided in the embodiment the present invention, the presentation image is generated through the acquired multi-viewpoint color/grayscale images of the video object and color/grayscale image of the presentation material, the presentation image supports the 3D display mode, and the presentation image is then displayed in the 3D mode, so as to solve the problem that only 2D video presentation is supported in the prior art, thereby achieving the 3D video presentation.

Embodiment Eight

Figure 20:
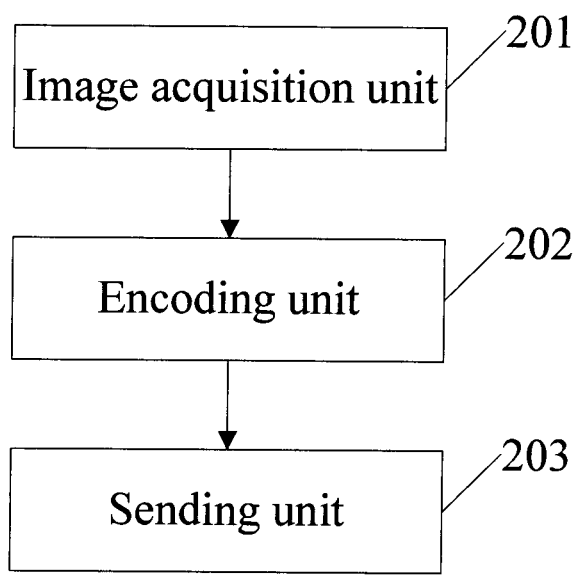
FIG. 20 is a schematic view of a device for sending video presentation according to a fifth device embodiment of the present invention.

In order to support remote video presentation, as shown in FIG. 20, in the embodiment, the present invention provides a video sending device, which includes an image acquisition unit 201, an encoding unit 202, and a sending unit 203.

The image acquisition unit 201 is configured to acquire color/grayscale images of at least two viewpoints of a video object to be presented and a color/grayscale image of at least one viewpoint of at least one presentation material.

The encoding unit 202 is configured to encode the color/grayscale images of the at least two viewpoints of the video object to be presented and the color/grayscale image of the at least one viewpoint of the at least one presentation material to obtain encoded images.

The sending unit 203 is configured to send the encoded images.

The image acquisition unit 201 includes an image acquisition module, a video segmentation module, and a multi-viewpoint image generation module.

The image acquisition module is configured to acquire depth information and at least one color/grayscale image of the same viewpoint in a scene in which the video object is located.

The video segmentation module is configured to perform video segmentation on the color/grayscale image at the same viewpoint according to the acquired depth information of the viewpoint, so as to acquire a video object.

The multi-viewpoint image generation module is configured to generate a color/grayscale image of at least one other viewpoint of the video object according to the acquired depth information of a viewpoint and the color/grayscale image of the same viewpoint.

Figure 21:
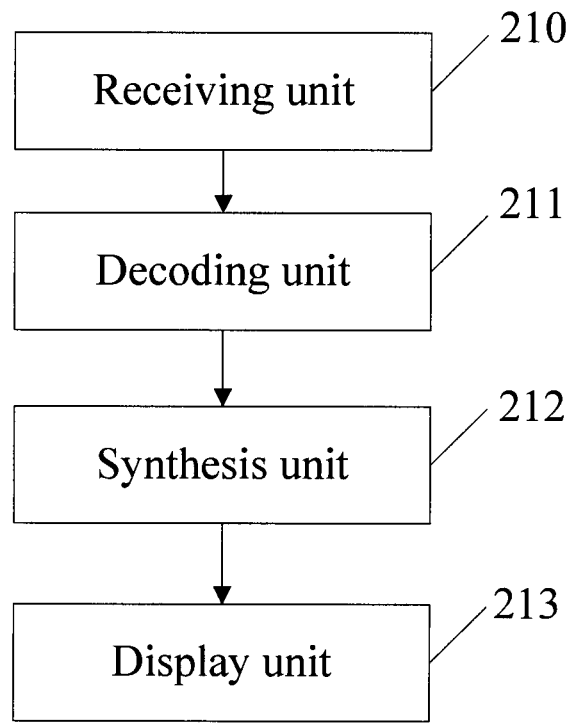
FIG. 21 is a schematic view of a device for receiving video presentation according to the fifth device embodiment of the present invention.

In order to further achieve the 3D presentation of the remote video, correspondingly, as shown in FIG. 21, in the embodiment, the present invention further provides a video receiving device, which includes a receiving unit 210, a decoding unit 211, a synthesis unit 212, and a display unit 213.

The receiving unit 210 is configured to receive encoded images.

The decoding unit 211 is configured to decode the received encoded images to acquire color/grayscale images of at least two viewpoints of a video object to be presented and a color/grayscale image of at least one viewpoint of at least one presentation material.

The synthesis unit 212 is configured to synthesize color/grayscale images of the at least two viewpoints of the video object and the color/grayscale image of the at least one viewpoint of the at least one presentation material to acquire a presentation image.

The display unit 213 is configured to display the presentation image in a 3D mode.

Specific work modes of the functional modules in the embodiment of the present invention are as described the sixth embodiment.

In the technical solution of the embodiment of the present invention, the presentation image is generated by acquiring the multi-viewpoint color/grayscale images of the video object and the color/grayscale image of the presentation material, the presentation image supports the 3D display mode, and the presentation image is then displayed in the 3D mode, so as to solve the problem that only 2D video presentation is supported in the prior art, thereby achieving the 3D video presentation.

Embodiment Nine

Figure 22:
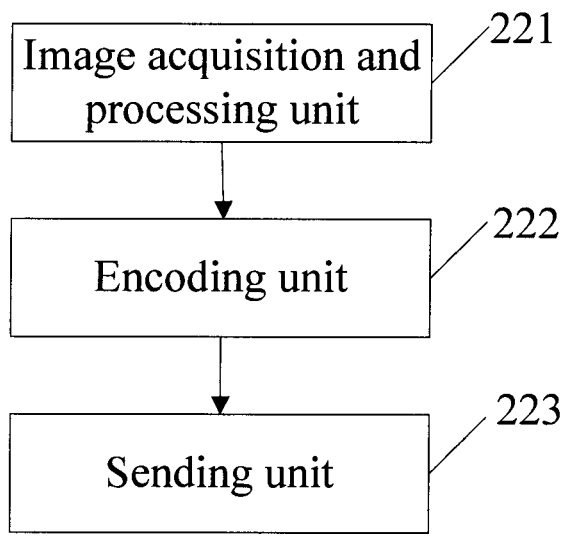
FIG. 22 is a schematic view of a device for sending video presentation according to a sixth device embodiment of the present invention.

In the embodiment, the present invention provides a video sending device. As shown in FIG. 22, the video sending device includes an image acquisition and processing unit 221, an encoding unit 222, and a sending unit 223.

The image acquisition and processing unit 221 is configured to acquire color/grayscale images of at least two viewpoints of a video object to be presented, and synthesize the color/grayscale images of the at least two viewpoints of the video object and the color/grayscale image of the at least one viewpoint of the at least one presentation material to acquire a presentation image.

The encoding unit 222 is configured to encode the presentation image to obtain an encoded image.

The sending unit 223 is configured to send the encoded image.

Specific work modes of the functional modules in the embodiment of the present invention are as described in the fifth embodiment.

In the technical solutions provided in the embodiment of the present invention, the presentation image is generated by acquiring the multi-viewpoint color/grayscale images of the video object and the color/grayscale image of the presentation material, the presentation image supports the 3D display mode, and the presentation image is then displayed in the 3D mode, so as to solve the problem that only 2D video presentation is supported in the prior art, thereby achieving the 3D video presentation.

Embodiment Ten

Figure 23:
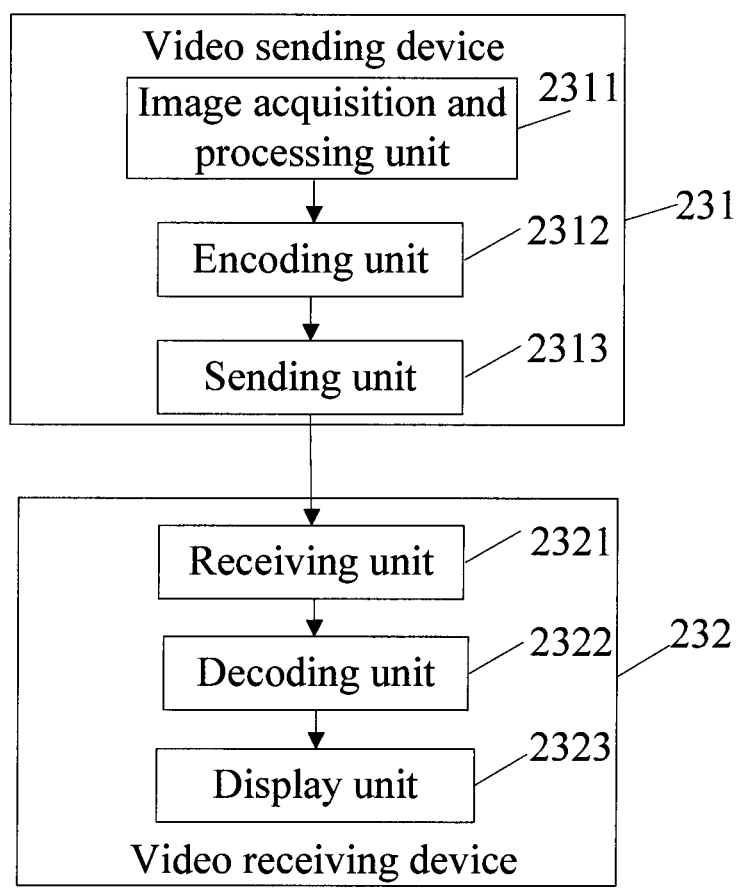
FIG. 23 is a schematic view of a communication system according to a system embodiment of the present invention.

In the embodiment, the present invention provides a video communication system. As shown in FIG. 23, the video communication system includes a video sending device 231 and a video receiving device 232.

The video sending device 231 includes an image acquisition and processing unit 2311, an encoding unit 2312, and a sending unit 2313.

The image acquisition and processing unit 2311 is configured to acquire color/grayscale images of at least two viewpoints of a video object to be presented and a color/grayscale image of at least one viewpoint of at least one presentation material, and synthesize the color/grayscale images of the at least two viewpoints of the video object and the color/grayscale image of the at least one viewpoint of the at least one presentation material to acquire a presentation image.

The encoding unit 2312 is configured to encode the presentation image to obtain an encoded image.

The sending unit 2313 is configured to send the encoded image.

The video receiving device 232 includes a receiving unit 2321, a decoding unit 2322, and a display unit 2323.

The receiving unit 2321 is configured to receive the encoded image.

The decoding unit 2322 is configured to decode the received encoded image to acquire the presentation image.

The display unit 2323 is configured to display the presentation image in a 3D mode.

Furthermore, when remote presentation is realized, the video communication system can further realize 3D display of the video image of the network receiving end at the sending end. Both the sending end and the receiving end can have the same video image processing and display functions, and at this time the video sending device 231 further includes a second decoding unit and a second display unit.

The second decoding unit is configured to decode the received encoded image and obtain the decoded presentation image.

The second display unit is configured to perform 3D display of the presentation image.

The video receiving device 232 further includes a second image acquisition and processing unit and a second encoding unit.

The second image acquisition and processing unit is configured to acquire color/grayscale images of at least two viewpoints of a video object to be presented and a color/grayscale image of at least one viewpoint of at least one presentation material, and synthesize the color/grayscale images of at least two viewpoints of the video object and the color/grayscale image of the at least one viewpoint of the at least one presentation material to acquire a presentation image.

The second encoding unit is configured to encode the presentation image to obtain an encoded image and send the encoded image.

In the technical solution provided in a system embodiment of the present invention, the presentation image is generated by acquiring the multi-viewpoint color/grayscale images of the video object and the color/grayscale image of the presentation material, the presentation image supports the 3D display mode, and the presentation image is then displayed in the 3D mode, so as to solve the problem that only 2D video presentation is supported in the prior art, thereby achieving the 3D video presentation.

In the system embodiment of the present invention, the sending end of the network can encode the presentation image including the video object and the presentation material for transmission through the network. The decoding unit at the receiving end of the network decodes the received data and subsequently the display unit presents the decoded image directly. However, the present invention is not thus limited. Optionally, the process also includes: at the sending end only the depth information and the color/grayscale images of the video object and the presentation material are encoded for transmission through the network; at the receiving end of the network, the decoded image and the stereo image of the presentation material are synthesized to acquire a presentation image, which is then presented by the display unit.

During synthesis of the multi-viewpoint images and acquisition of the presentation image, position information of the video object can further be calculated according to the depth information. Recognition information is generated for the gesture of the video object, and the recognition information is converted into control command information, so as to control the video processing unit.

In the video communication system provided in the system embodiment of the present invention, the 2D presentation and the 3D presentation are compatible, so as to display the decoded image in a 2D or 3D mode.

In the technical solution provided in the system embodiment of the present invention, the presentation image is generated by acquiring the multi-viewpoint color/grayscale images of the video object and the color/grayscale image of the presentation material, the presentation image supports the 3D display mode, and the presentation image is displayed in the 3D mode, so as to solve the problem that only 2D video presentation is supported in the prior art, thereby achieving the 3D video presentation.

Persons of ordinary skill in the art may understand that all or part of the steps of the method according to the embodiment of the present invention may be implemented by a program instructing relevant hardware. The program may be stored in a computer readable storage medium.

The above descriptions are merely embodiment of the present invention, but not intended to limit the protection scope present invention. Various variations or replacements made by persons skilled in the art without departing from the technical scope of the present invention fall within the protection scope of the present invention as defined by the appended claims. Therefore, the protection scope of the present invention is subject to the appended claims.

What is claimed is:

1. A video processing method, comprising:

acquiring by a sending end of a single camera, color/grayscale images of at least two viewpoints of a video object to be presented and a color/grayscale image of at least one viewpoint of at least one presentation material, wherein the presentation material comprises content to be presented which is generated by a computer; and synthesizing by the sending end, the color/grayscale images of the at least two viewpoints of the video object and the color/grayscale image of the at least one viewpoint of the at least one presentation material to acquire a presentation image;

wherein the acquiring of the color/grayscale images of the at least two viewpoints of the video object to be presented comprising using the single camera simultaneously acquiring depth information and color/grayscale image, wherein the depth information is acquired in a first viewpoint of the at least two viewpoints, wherein at least one color/grayscale image is acquired from the first viewpoint of a scene which the video object is located;

performing video segmentation on the color/grayscale image of the first viewpoint according to the depth information of the viewpoint in order to acquire the video object; and generating a color/grayscale image of a second viewpoint of the at least two viewpoints of the video object according to the depth information of the first viewpoint and the color/grayscale image of the first viewpoint; and acquiring by the sending end, position information and control command information of the video object, wherein the position information is acquired through a depth image, and is configured to control the position of the video object in the presentation material, the control command information is configured to control the content of the presentation material and the position of the video object in the presentation material according to the depth image, wherein gesture from the video object is recognized and gesture recognition information is converted into the control command information; wherein the synthesizing of the color/grayscale images of the at least two viewpoints of the video object and the color/grayscale image of the at least one viewpoint of the at least one presentation material to acquire the presentation image comprising:

synthesizing by the sending end, the color/grayscale images of the at least two viewpoints of the video object and the color/grayscale image of the at least one viewpoint of the at least one presentation material to acquire the presentation image according to the position information and the control command information.

2. The video processing method according to claim 1, further comprising:

displaying the presentation image by 3D video presentation; or encoding the presentation image, and sending the encoded presentation image.

3. The video processing method according to claim 1, further comprising:

encoding, by a sending end, the color/grayscale images of the at least two viewpoints of the video object to be presented and the color/grayscale image of the at least one viewpoint of the at least one presentation material;

sending, by the sending end, the encoded images to a receiving end; and wherein the receiving end is configured to: receive the encoded images, decode the encoded images to obtain color/grayscale images of at least two viewpoints of a video object to be presented and a color/grayscale image of at least one viewpoint of at least one presentation material, synthesize the color/grayscale images of the at least two viewpoints of the video object and the color/grayscale image of the at least one viewpoint of the at least one presentation material to acquire a presentation image, and displaying the presentation image by 3D video presentation.

4. A video processing method, comprising:

acquiring by a sending end, color/grayscale images of at least two viewpoints of a video object to be presented and a color/grayscale image of at least one viewpoint of at least one presentation material, wherein the presentation material comprises content to be presented which is generated by a computer; and synthesizing by the sending end, the color/grayscale images of the at least two viewpoints of the video object and the color/grayscale image of the at least one viewpoint of the at least one presentation material to acquire a presentation image;

wherein the acquiring of the color/grayscale images of the at least two viewpoints of the video object to be presented comprising:

using one camera simultaneously acquiring depth information and color/grayscale image, wherein the depth information is acquired in a first viewpoint of the at least two viewpoints, wherein at least one color/grayscale image is acquired from the first viewpoint of a scene which the video object is located;

performing video segmentation on the color/grayscale image of the first viewpoint according to the depth information of the viewpoint in order to acquire the video object; and generating a color/grayscale image of a second viewpoint of the at least two viewpoints of the video object according to the depth information of the first viewpoint and the color/grayscale image of the first viewpoint;

wherein the method further comprising:

acquiring by the sending end, position information and control command information of the video object, wherein the position information is acquired through a depth image, and is configured to control the position of the video object in the presentation material, the control command information is configured to control the content of the presentation material and the position of the video object in the presentation material according to the depth image, wherein gesture from the video object is recognized and gesture recognition information is converted into the control command information; wherein the synthesizing of the color/grayscale images of the at least two viewpoints of the video object and the color/grayscale image of the at least one viewpoint of the at least one presentation material to acquire the presentation image comprising:

synthesizing by the sending end, the color/grayscale images of the at least two viewpoints of the video object and the color/grayscale image of the at least one viewpoint of the at least one presentation material to acquire the presentation image according to the position information and the control command information.

5. A video processing method, comprising:

acquiring by a sending end, color/grayscale images of at least two viewpoints of a video object to be presented and a color/grayscale image of at least one viewpoint of at least one presentation material, wherein the presentation material comprises content to be presented which is generated by a computer; and encoding by the sending end, the color/grayscale images of the at least two viewpoints of the video object to be presented and the color/grayscale image of the at least one viewpoint of the at least one presentation material;

sending by the sending end, the encoded images to a receiving end;

decoding by the receiving end, the color/grayscale images of the at least two viewpoints of the video object to be presented and the color/grayscale image of the at least one viewpoint of the at least one presentation material;

synthesizing by the receiving end, the color/grayscale images of the at least two viewpoints of the video object and the color/grayscale image of the at least one viewpoint of the at least one presentation material to acquire a presentation image;

wherein the acquiring of the color/grayscale images of the at least two viewpoints of the video object to be presented comprising:

using one camera simultaneously acquiring depth information and color/grayscale image, wherein depth information is acquired in a first viewpoint of the at least two viewpoints, wherein at least one color/grayscale image is acquired from the first viewpoint of a scene which the video object is located;

performing video segmentation on the color/grayscale image of the first viewpoint according to the depth information of the viewpoint in order to acquire the video object; and generating a color/grayscale image of a second viewpoint of the at least two viewpoints of the video object according to the depth information of the first viewpoint and the color/grayscale image of the first viewpoint;

wherein the method further comprising:

acquiring by the receiving end, position information and control command information of the video object, wherein the position information is acquired through a depth image, and is configured to control the position of the video object in the presentation material, the control command information is configured to control the content of the presentation material and the position of the video object in the presentation material according to the depth image, wherein gesture from the video object is recognized and gesture recognition information is converted into the control command information; wherein the synthesizing of the color/grayscale images of the at least two viewpoints of the video object and the color/grayscale image of the at least one viewpoint of the at least one presentation material to acquire the presentation image comprising:

synthesizing by the receiving end, the color/grayscale images of the at least two viewpoints of the video object and the color/grayscale image of the at least one viewpoint of the at least one presentation material to acquire the presentation image according to the position information and the control command information.

6. A three-dimensional (3D) video processing device within a single camera, comprises:
an image acquisition and processing unit, configured to:
acquire color/grayscale images of at least two viewpoints of a video object to be presented and a color/grayscale image of at least one viewpoint of at least one presentation material, wherein the presentation material comprises content to be presented which is generated by a computer; and
synthesize the color/grayscale images of the at least two viewpoints of the video object and the color/grayscale image of the at least one viewpoint of the at least one presentation material to acquire a presentation image;
wherein the image acquisition and processing unit of the single camera configured to:
simultaneously obtain depth information and color/grayscale image, wherein the depth information is acquired in a first viewpoint of the at least two viewpoints, wherein at least one color/grayscale image is acquired from the first viewpoint of a scene which the video object is located;
perform video segmentation on the color/grayscale image of the first viewpoint according to the depth information of the viewpoint in order to acquire the video object;
generate a color/grayscale image of a second viewpoint of the at least two viewpoints of the video object according to the depth information of the first viewpoint and the color/grayscale image of the first same viewpoint; and
synthesize color/grayscale images of the at least two viewpoints of the video object and the color/grayscale image of the at least one viewpoint of the at least one presentation material to acquire the presentation image according to the position information and the control command information;
wherein the image acquisition and processing unit further configured to:
acquire position information and control command information of the video object, wherein the position information is acquired through a depth image, and is configured to control the position of the video object in the presentation material, the control command information is configured to control the content of the presentation material and the position of the video object in the presentation material, according to the depth image, wherein gesture from the video object is recognized and the gesture recognition information is converted into the control command information; and
synthesize color/grayscale images of the at least two viewpoints of the video object and the color/grayscale image of the at least one viewpoint of the at least one presentation material to acquire the presentation image according to the position information and the control command information.

7. The video processing device according to claim 6, further comprising:
a display unit, configured to display the presentation image by 3D video presentation; or
an encoding unit configured to encode the presentation image to obtain an encoded image, and a sending unit configured to send the encoded image to a video receiving device.

8. The video processing device according to claim 7, further comprising:
a receiving unit, configured to receive an encoded image from a video sending device; and
a decoding unit, configured to decode the encoded image to acquire the presentation image, wherein the presentation image is displayed by 3D video presentation by the display unit.

9. A video processing device, comprises:
an image acquisition and processing unit, configured to:
acquire color/grayscale images of at least two viewpoints of a video object to be presented and a color/grayscale image of at least one viewpoint of at least one presentation material, wherein the presentation material comprises content to be presented which is generated by a computer; and
synthesize the color/grayscale images of the at least two viewpoints of the video object and the color/grayscale image of the at least one viewpoint of the at least one presentation material to acquire a presentation image;
wherein the image acquisition and processing unit further configured to:
simultaneously obtain depth information and color/grayscale image by a camera, wherein the depth information is acquired in a first viewpoint of the at least two viewpoints, wherein at least one color/grayscale image is acquired from the first viewpoint of a scene which the video object is located;
perform video segmentation on the color/grayscale image of the first viewpoint according to the depth information of the viewpoint in order to acquire the video object;
generate a color/grayscale image of a second viewpoint of the at least two viewpoints of the video object according to the depth information of the first viewpoint and the color/grayscale image of the first viewpoint; and
wherein the image acquisition and processing unit further configured to:
acquire position information and control command information of the video object, wherein the position information is acquired through a depth image, and is configured to control the position of the video object in the presentation material, the control command information is configured to control the content of the presentation material and the position of the video object in the presentation material according to the depth image, wherein gesture from the video object is recognized and gesture recognition information is converted into the control command information; and
synthesize color/grayscale images of the at least two viewpoints of the video object and the color/grayscale image of the at least one viewpoint of the at least one presentation material to acquire the presentation image according to the position information and the control command information.

10. The video processing device according to claim 9, further comprises:
a display unit, configured to display the presentation image by 3D video presentation; or an encoding unit configured to encode the presentation image to obtain an encoded image, and a sending unit configured to send the encoded image to a video receiving device.

\* \* \* \* \*